US008576570B2

(12) United States Patent
Nguyen et al.

(10) Patent No.: US 8,576,570 B2
(45) Date of Patent: Nov. 5, 2013

(54) ADAPTIVE COMPUTING SYSTEM WITH MODULAR CONTROL, SWITCHING, AND POWER SUPPLY ARCHITECTURE

(75) Inventors: An Van Nguyen, Fairfax, VA (US); M. Dewayne Adams, Fairfax, VA (US); Nesdon Alexandre' Harris, Manassas, VA (US); Dinh Van Nguyen, San José, CA (US); Binh Kien Thai, Manassas, VA (US)

(73) Assignee: NCS Technologies, Inc., Gainesville, VA (US)

( * ) Notice: Subject to any disclaimer, the term of this patent is extended or adjusted under 35 U.S.C. 154(b) by 434 days.

(21) Appl. No.: 13/052,934

(22) Filed: Mar. 21, 2011

(65) Prior Publication Data

US 2012/0243160 A1    Sep. 27, 2012

(51) Int. Cl.
*H05K 5/00* (2006.01)
*H05K 7/16* (2006.01)
*H05K 7/00* (2006.01)

(52) U.S. Cl.
USPC ............ 361/730; 361/725; 361/735; 361/736

(58) Field of Classification Search
USPC ..................... 361/679.02, 724–732, 735–736
See application file for complete search history.

(56) References Cited

U.S. PATENT DOCUMENTS

| | | | | |
|---|---|---|---|---|
| 3,751,127 | A * | 8/1973 | Black et al. .................... | 312/111 |
| 5,006,961 | A | 4/1991 | Monico ........................... | 361/413 |
| 5,227,957 | A | 7/1993 | Deters ............................ | 361/395 |
| 5,229,926 | A | 7/1993 | Donaldson et al. .............. | 363/50 |
| 5,602,721 | A | 2/1997 | Slade et al. .................... | 361/727 |
| 5,737,189 | A * | 4/1998 | Kammersgard et al. ....... | 361/726 |
| 5,816,673 | A | 10/1998 | Sauer et al. .................. | 312/223.2 |
| 5,909,357 | A | 6/1999 | Orr .................................. | 361/687 |
| 5,966,292 | A | 10/1999 | Amberg et al. ................ | 361/733 |
| 6,038,126 | A * | 3/2000 | Weng ......................... | 361/679.01 |
| 6,055,418 | A | 4/2000 | Harris et al. ..................... | 455/91 |
| 6,115,242 | A * | 9/2000 | Lambrecht ..................... | 361/788 |
| 6,137,686 | A * | 10/2000 | Saye .............................. | 361/732 |
| 6,272,573 | B1 * | 8/2001 | Coale et al. ..................... | 710/100 |
| 6,366,454 | B1 | 4/2002 | Rapaich et al. ................ | 361/683 |
| 6,469,901 | B1 | 10/2002 | Costner .......................... | 361/730 |
| 6,490,157 | B2 * | 12/2002 | Unrein ...................... | 361/679.46 |
| 6,496,376 | B1 | 12/2002 | Plunkett et al. ................ | 361/729 |

(Continued)

OTHER PUBLICATIONS

"Energy Star® Program Requirements for Computers, Partner Commitments", "Energy Star® Program Requirements Product Specification for Computers, Eligibility Criteria Draft Version 5.2", and "Energy Star® Program Requirements Product Specification for Computers, Test Method", Aug. 2010, 28 pages.

(Continued)

*Primary Examiner* — Adrian S Wilson
(74) *Attorney, Agent, or Firm* — Pillsbury Winthrop Shaw Pittman LLP

(57) ABSTRACT

The adaptive computing system described herein may generally include a modular control, switching, and power supply architecture. In particular, the adaptive computing system may provide a platform supporting multiple independent desktop computer modules that occupy less physical space than a standalone commercial computer, provide performance density comparable to current server solutions, and address concerns relating to stability, safety, productivity, performance, assembly, service, and other factors important to diverse desktop computer user communities. Moreover, mechanical, electrical, and functional components associated with the adaptive computing system may have various certifications or otherwise be relied upon to demonstrate compliance with criteria in regulatory, environmental, consumer safety, and other contexts.

20 Claims, 10 Drawing Sheets

Connection Diagram

(56) References Cited

U.S. PATENT DOCUMENTS

| | | | |
|---|---|---|---|
| 6,507,882 B1* | 1/2003 | Golka et al. | 710/302 |
| 6,661,648 B2 | 12/2003 | Dayley | 361/683 |
| 6,698,851 B1* | 3/2004 | Ludl | 312/108 |
| 6,850,408 B1* | 2/2005 | Coglitore et al. | 361/679.4 |
| D505,949 S * | 6/2005 | Chen et al. | D14/313 |
| 7,083,468 B2 | 8/2006 | Walker et al. | 439/541.5 |
| 7,239,509 B1 | 7/2007 | Roeske | 361/683 |
| 7,307,834 B2 | 12/2007 | Jones et al. | 361/683 |
| 7,403,379 B2* | 7/2008 | Rumney | 361/679.33 |
| 7,821,790 B2 | 10/2010 | Sharma et al. | 361/727 |
| 7,843,692 B2 | 11/2010 | Everhart et al. | 361/695 |
| 2002/0063621 A1* | 5/2002 | Tseng et al. | 340/2.7 |
| 2003/0007321 A1* | 1/2003 | Dayley | 361/683 |
| 2004/0184242 A1* | 9/2004 | Jones et al. | 361/724 |
| 2005/0073819 A1* | 4/2005 | McCubbrey | 361/785 |
| 2006/0080559 A1 | 4/2006 | Sauber | 713/300 |
| 2007/0177294 A1* | 8/2007 | Adachi | 360/55 |
| 2007/0247802 A1* | 10/2007 | Imsand | 361/685 |
| 2008/0002346 A1 | 1/2008 | Lin et al. | 361/683 |
| 2008/0037208 A1* | 2/2008 | Chien | 361/683 |
| 2008/0285221 A1* | 11/2008 | Imsand et al. | 361/681 |

OTHER PUBLICATIONS

IEEE Standard 1680.1, Section 4, Environmental Performance Criteria for Desktop Personal Computers, Notebook Personal Computers and Personal Computer Displays, 10 pages.

"Understanding the FCC Regulations for Computers and Other Digital Devices", *Office of Engineering and Technology Federal Communications Commission*, OET Bulletin No. 62, Dec. 1993, 16 pages.

"WHQL Testing", (Windows Hardware Quality Labs Testing), Creative Commons Attribution—Share Alike 3.0 Unported, http://creativecommons.org/licenses/by-sa/3.0/, 3 pages.

Howard, A. J., et al., "Defining Efficiency in a Rapidly Changing World: Specifications and Incentives for High Performance Data Centers and High Efficiency IT Equipment", © 2010 ACEEE Summer Study on Energy Efficiency in Buildings, pp. 4-102 to 4-112.

EUR-Lex-32002L0095-EN, Directive 2002/95/EC of the European Parliament and of the Council of Jan. 27, 2003 on the restriction of the use of certain hazardous substances in electrical and electronic equipment, Official Journal L 037, Feb. 13, 2003, pp. 0019-0023.

Nguyen, Dinh, "Hampton Way Backplane Specification", Version 0.6, NCS Technologies, Inc., Dec. 13, 2010, 25 pages.

Nguyen, Dinh, "Hampton Way Ethernet, Control and KVM (ECKVM) Switch Specification", Version 0.3, NCS Technologies, Inc., Dec. 16, 2010, 26 pages.

Nguyen, Dinh, Hampton Way Motherboard Specification (Silver Board), Version 0.7, NCS Technologies, Inc., Jan. 4, 2011, 18 pages.

Nguyen, Dinh, "Hampton Way System Specification", Version 0.6, NCS Technologies, Inc., Dec. 22, 2010, 17 pages.

Thai, Binh K., "Hampton Way Remote Control Hardware Specification", Revision 2.5, NCS Technologies, Inc., Dec. 22, 2010, 9 pages.

* cited by examiner

Industrial Design

Connection Diagram

Power Backplane - Base Module

ECKVM Switch - Master Controller

Backplane Topology - Side View

Backplane Topology - Front View

Safety Interlock System

Motherboard - Computer Module

Form Factor - ECKVM Switch

KVM Switch Diagram

Remote Control Block Diagram

ADAPTIVE COMPUTING SYSTEM WITH MODULAR CONTROL, SWITCHING, AND POWER SUPPLY ARCHITECTURE

FIELD OF THE INVENTION

The invention generally relates to an adaptive computing system having a modular control, switching, and power supply architecture, and in particular, to a computing platform designed to support multiple independent desktop computer modules that can occupy less space than commercial standalone mini towers currently require, offer desktop computer performance density that can currently be achieved only in server solutions, and open opportunities relating to desktop computer stability, safety, productivity, performance, assembly, service, and other factors important to diverse user communities.

BACKGROUND OF THE INVENTION

In modern computing contexts, individual users frequently need multiple computers to perform different tasks that relate to many areas, including business, government, and personal use cases. As a result, individual users frequently deploy multiple complete desktop computers to meet the need to have multiple computers, leading to new concerns that typical information technology solutions have failed to address. For example, having multiple computers deployed in a particular work space can cause increased power consumption and thermal output in small areas, crowded or cluttered work spaces due to multiple computers occupying a limited area, and challenging cable management, among other things. Moreover, information technology trends that include virtual and remote systems can create unique challenges to information technology infrastructures, including requirements to completely redesign or rethink strategies relating to software deployment and system management. Thus, although the solutions most commonly most used today to address user needs to have multiple computers tend to impose high initial deployment costs, which can undercut the promise that these solutions have to lower long-term total ownership cost. Additionally, many information technology organizations are continuing to grapple with legacy security requirements from the 1980's, which mandate computers having certain security classifications to be physically located thirty-six inches away from computers having lesser classifications. These policies were initially meant to prevent radio frequency emissions from one machine infiltrating and interfering with another, which was needed to protect sensitive information in a computing era with a very different radio frequency (or electromagnetic interference) noise floor. Although these policies still have limited enforcement today, deploying multiple computers within a particular space may raise compliance concerns if the computers are placed in close proximity.

Consequently, because computer designs typically change as quickly as the seasons, the information technology community has failed to develop a desktop computer design that can satisfactorily and simultaneously address the needs to easily deploy multiple desktop computers at a low initial cost while ensuring optimal stability, safety, performance, regulatory compliance, and other customer concerns. In particular, modern consumers demand desktop computer designs that can be deployed over the long-term and appear modern and innovative. The marketplace has experienced difficulty in meeting these goals, due in large part to rapid changes in market trends and substantial capital investment requirements that interfere with frequent redesign. Furthermore, existing desktop computing platforms are normally designed to be deployed on the floor, which many users consider an inconvenient place. In particular, the typical user views their monitor, keyboard, and mouse as interfaces to the computer, but simple tasks like turning a computer on means that the user has to reach down to the floor to flip a switch. Even if a user wanted to place the computer on their desk to be nearer to the monitor, keyboard, and mouse interfaces, the user would then have to deal with several bulky cables entering a box that never seems to quite sit on the desk perfectly. To the extent that certain systems enable users to press specific keyboard button sequences to solve these concerns, keyboard-based switching may be unacceptable to many customers due to the risks associated therewith (e.g., accidentally triggering a particular action due to mistyping).

Another important concern in modern computing contexts relates to managing power and deployment. For example, certain customers that user multiple different computers may require discrete power supplies to address concerns relating to security, one shared power supply that can potentially be a single-point failure to an entire system, or an individual computer having increased power requirements that cannot justify the increased cost associated with a larger shared power supply. However, existing computer designs have fallen short in providing customers with the flexibility to dynamically manage supplying power to multiple computers that may have different security or power consumption requirements. Moreover, interconnecting multiple computers using commercially available switches tends to quickly become a cabling nightmare because every port that maintains a connection between the switch and a particular computer requires four cables, namely, two monitor cables, one Universal Serial Bus (USB) cable, and one audio cable. As such, installing commonly available switches brings all these cables onto the desk in addition to network cables and other cables needed to connect two displays, a keyboard, a mouse, speakers, and other console devices. Although certain vendors have attempted to make custom cables that purportedly address these cabling issues, these custom cables tend to be thick and inflexible.

Accordingly, because computers are playing an ever increasing role in modern society, where a desktop computer could be anything from a classic box to a graphics machine, consumers value a computing experience that reflects their unique traits. For example, users frequently place personal objects that represent their personality and image in their work spaces, and users expect their computing environment to reflect their uniqueness and individuality. However, the commercially available systems that enable deploying multiple desktop computers tend to fall short in adequately addressing how users want to interact with technology, which include concerns that relate to form and function. Further, concern over environmental hazards and personal ecological responsibility are becoming increasingly important to consumers, but many desktop computers still include circuit boards with brominated flame retardant (BFR), cables with polyvinyl chloride (PVC), non-recyclable parts, excessive packaging materials, and other environmental hazards. As such, the marketplace has failed to deliver a suitable computing platform or other solution that can address these and other concerns.

SUMMARY OF THE INVENTION

According to one aspect of the invention, the adaptive computing system described herein may have a modular control, switching, and power supply architecture. In particular, the adaptive computing system described herein may provide a platform that represents a forward-looking desktop design that may address user needs to deploy multiple computers in a work space. In one implementation, the design associated with the adaptive computing system may further address concerns relating to power consumption and thermal output in small areas, suitable physical dimensions in limited work spaces, simplified cabling and deployment, and low initial cost, among other things. Further, the adaptive computing system may maintain current approaches to software deployment and system management and provide users with flexibility to manage devices deployed on the platform to achieve a multiple desktop solution. For example, the adaptive computing system may permit users to deploy various computer modules that have different processor and memory configurations, while having identical motherboards to simplify deployment on the platform. Further, relative to traditional desktop computers, users may realize savings in the space needed to deploy the adaptive computing system, the power that the adaptive computing system consumes, and the heat exhausted into the space surrounding the adaptive computing system, among other things. Moreover, the adaptive computing system may be convenient to operate, especially to users who may have previously relied on multiple desktop computers and keyboard-video-mouse (KVM) switches to interconnect the multiple desktop personal computers. In one implementation, the adaptive computing system described herein may include a modular control, switching, and power supply architecture to provide a design that can meet the needs associated with diverse user communities, as will be described in further detail herein.

According to one aspect of the invention, the modular control, switching, and power supply architecture associated with the adaptive computing system may enable users to deploy a stack having various computer modules, which may represent compact, high-density, and independent computing solutions. In particular, the modular architecture may include various building blocks that may be utilized to construct the adaptive computing system in a manner that meets the particular needs associated with any particular user. For example, in one implementation, the various building blocks may generally include a base module to provide a common power supply and common Ethernet-Control-KVM (ECKVM) switching functionality to the entire stack and one or more power and ECKVM backplanes having mechanical and electrical interconnections to stabilize the various computer modules in the stack and carry power signals and ECKVM switching signals to and from the base module, wherein the ECKVM switching signals may include network (or Ethernet) signals, infrastructure control signals, and input/output device signals. In one implementation, the building blocks may further include a remote control to operate the stack and the ECKVM switching functionality integrated therein and one or more computer modules to provide independent personal computer functionality on the stack. In one implementation, any particular computer module deployed on the platform may have a discrete power supply or draw power from the common power supply in the base module. In the former case, the computer module may be deployed as a stand-alone small form-factor personal computer without necessarily being connected to the base module, which would then simply include a small auxiliary power supply to power the underlying infrastructure (e.g., the ECKVM switch and the power and ECKVM backplanes). Alternatively, where a particular computer module does not have a discrete power supply, the computer module may draw power from the common power supply enclosed in the base module.

According to one aspect of the invention, the base module, the power and ECKVM backplanes, and any computer modules deployed in the stack may be enclosed within small, rectangular housings, which may be electrically connected via electrical interconnections in the power and ECKVM backplanes, while the housings may include various tool-less mechanical alignment and securing mechanisms to mechanically connect and secure the base module, the power and ECKVM backplanes, and the computer modules in a vertical stack. In a smallest deployment, where the stack includes one computer module with a discrete power supply, the computer module and discrete power supply may combine to have a height approximately two-thirds smaller than a standard mini-tower (i.e., approximately 145 millimeters, whereas standard mini-towers typically have an approximate four-hundred and thirty-one millimeter height). Furthermore, in larger deployments the stack may include the base module in addition to multiple computer modules (e.g., up to three computer modules), whereby the combined stack may have different heights that nonetheless remain smaller than a standard mini-tower. As such, the design may take the various possible heights into account to ensure that the stack will be sufficiently stable to remain upright and tolerate forces exerted on the upper modules without falling over, whereby the design associated with the adaptive computing system may prevent data loss and reduce injury risk that could otherwise occur if the stack were to fall. For example, in many (or most) cases the adaptive computing system will be deployed on the floor, which may typically have a low-pile carpeted covering that does not easily maintain an object in a vertical position, the design associated with the adaptive computing system may employ modern manufacturing methods and materials to provide stability, safety, performance, image, and easy assembly and service, which tend to be important factors that users consider when making decisions relating to what computer to purchase.

According to one aspect of the invention, to ensure that the adaptive computing system will be stable and safe to end users, the base module may have a safety design that can prevent accidental shock or potential injuries. For example, because the stack may include multiple computer modules (e.g., three or more computer modules), the base module may need to provide 1.5 kilowatts (kW) into the stack to power the various components deployed therein, wherein the safety design may include various mechanical and electrical lockouts that can prevent the stack from powering on while a lid or any other modules are removed or improperly seated. Furthermore, the safety design may be documented and tested through independent product safety certification organizations, such as Underwriters Laboratories Inc. ("UL"), and quality control processes may be employed during manufacturing to check and validate that the safety lockouts function properly before any system will be shipped to the customer. In one implementation, to ensure that the adaptive computing system will be easy to assemble and service, the housings associated with the base module, the power and ECKVM backplanes, and any computer modules deployed in the stack may comprise tool-less chassis, which may provide strength and stability to the overall stack. As such, any major components may be installed in and removed from the base module, the power and ECKVM backplanes, and any computer modules deployed therein without any tools. In addition to simplifying assembly and service, the tool-less chassis design may ensure safety and quality. For example, because a user unlocking the lid or another housing may potentially move levers or other mechanical objects in the stack, the tool-less chassis may be designed to disengage certain modules from the mechanical retention mechanisms to allow the modules to be easily removed.

According to one aspect of the invention, the adaptive computing system may further include a thermal design to maintain a low noise profile and ensure that individual computer modules deployed therein perform similarly to a system housed in a large volume chassis. For example, the thermal design may include various heat pipes to move thermal mass to different locations, and various specifically positioned fans may target airflow to redirect heat (e.g., the heat pipes may channel heat to a radiator, and the fans may then target airflow through the radiator to exhaust the heat from the adaptive computing system). In particular, the thermal design may direct airflow from the front towards the rear, where the heat may be exhausted. In one implementation, the heat pipe design may similar to solutions commonly used in commercial laptops, while the targeted fan design may be similar to solutions commonly used in commercial servers, which can maintain substantial thermal mass in vertically stacked deployments. Further, the thermal design may enable any individual computer module in the stack to handle thermal mass originating therein, and may be tested in elevated temperature environments to model scenarios where the stack may be deployed on the floor, in a corner, or another tight space. In one implementation, the thermal design may be tested based on the "Department of Defense Test Method Standard for Environmental Engineering Considerations and Laboratory Tests" (i.e., the United States Military Standard MIL-STD-810G), which provides methodical approaches to test and validate the thermal design, and additional tests may evaluate how dust and other particles effect the thermal solution. As such, the heat pipes and targeted fans used in the thermal design may combine practices that have previously been limited to managing thermal output in other computer contexts, which may allow the platform to package high performance processor technology in substantially less volume than otherwise required in standard mini-tower desktops.

According to one aspect of the invention, the adaptive computing system described herein may eliminate many cables that would otherwise be required to deploy a multiple desktop computer solution to allow users to place the adaptive computing system in any suitable location and improve the overall appearance and usability in their work space. In particular, because the platform may enable multiple computer modules to be deployed in a vertical stack, the mechanical and electrical integration employed therein may enable video, audio, and other signal cables to be moved to a central location without substantially degrading quality associated therewith, which may permit integrating Ethernet, infrastructure control, KVM, and other switches into the base module and improve cable management in the overall stack. For example, in one implementation, the ECKVM switch integrated into the base module may route display, USB, audio, and other input/output (or KVM) signals from any particular computer module deployed on the stack to common output connectors on the integrated ECKVM switch, which may be shared with other computer modules deployed on the stack. In one implementation, controls associated with the integrated ECKVM switch may be situated on a remote control, which may ensure that the other computer modules can be reliably connected to the ECKVM switch and guarantee that mistaken switching will not occur. For example, the integrated ECKVM switch may have a board that directly mounts connectors associated with display, keyboard, mouse, microphone, speaker, and other input/output or console devices, wherein a rear panel associated with the base module may provide access to the mounted connectors that may be used to connect the various input/output or other console devices to the ECKVM switch. As such, the remote control may allow users to manage power associated with any computer module in the stack and switch among any computer modules that are operational via the ECKVM switch, wherein two respective cables may connect the base module to the power management and ECKVM switching elements on the remote control, thereby substantially eliminating the cables needed to control the multiple computer modules that may be deployed on the stack.

According to one aspect of the invention, the design associated with the adaptive computing system described herein may therefore provide stability, safety, performance, and easy assembly and service and consider many factors that tend to be important to computer purchasing decisions across diverse user communities. For example, the computer modules may be designed, tested, and packaged with drivers and other software compatible with Windows versions, Linux versions, and other operating system versions that are commonly used in the commercial computer market, and future implementations may include be software-compatible with operating system versions that may subsequently become more common or popular. Moreover, to reflect that computers tend to represent user personalities and image, color, form-factor, and other designs in the adaptive computing system may generally revolve around themes relating to quality, innovation, integration, and green technology to fit within (rather than dominate) personal environments. In particular, every module, cable, shipping box, or other material used in the design may communicate value, including buttons that users will touch and feel during the computing experience. For example, the adaptive computing system may be designed to have tight fitting connectors, housings constructed with hard plastics and smooth finishes to convey image, and front panels to conceal otherwise exposed storage devices and provide a consistent and organized appearance. Further, in closed positions, the front panels may preserve the consistent and organized appearance, wherein post-market off-the-shelf devices may be installed without causing a dissimilar appearance, and different computer modules may have different front panels having different finish colors to identify computer modules having different characteristics (e.g., computer modules with different security classification domains). Furthermore, average desktop computers tend to use power supplies inefficiently (i.e., typically being shipped with three-hundred watt power supplies even though most computers only require one-hundred and twenty-five to one-hundred and fifth watts). In contrast, the adaptive computing system may share a common power supply across multiple computer modules to optimize power supply, eliminate brominated flame retardant (BFR) from all circuit boards used therein, eliminate polyvinyl chloride (PVC) from all cables used therein, and use recyclable mechanical materials. As such, the platform and functionality associated with the adaptive computing system may be designed to meet or exceed Electronic Product Environmental Assessment (EPEAT®) Gold environmental performance criteria, while packaging material may be substantially reduced without compromising product integrity during shipment to provide additional environmental benefits.

Accordingly, the adaptive computing system and the modular control, switching, and power supply architecture that will be described in further detail herein may allow multiple independent computer modules to occupy less space than commercial standalone mini towers currently require, and may offer performance density in a desktop solution that can only be achieved currently in a server solution. As such, the adaptive computing system and the modular control, switching, and power supply architecture to be described in further detail herein may create a new desktop computer metaphor and open new opportunities relating to stability, safety, productivity, performance, assembly, service, and other factors important to modern and diverse user communities.

Other objects and advantages of the invention will be apparent to those skilled in the art based on the following drawings and detailed description.

BRIEF DESCRIPTION OF THE DRAWINGS

FIG. 8 illustrates an exemplary form-factor associated with the modular switching architecture that may be used in the adaptive computing system described herein, while

DETAILED DESCRIPTION

Figure 1:
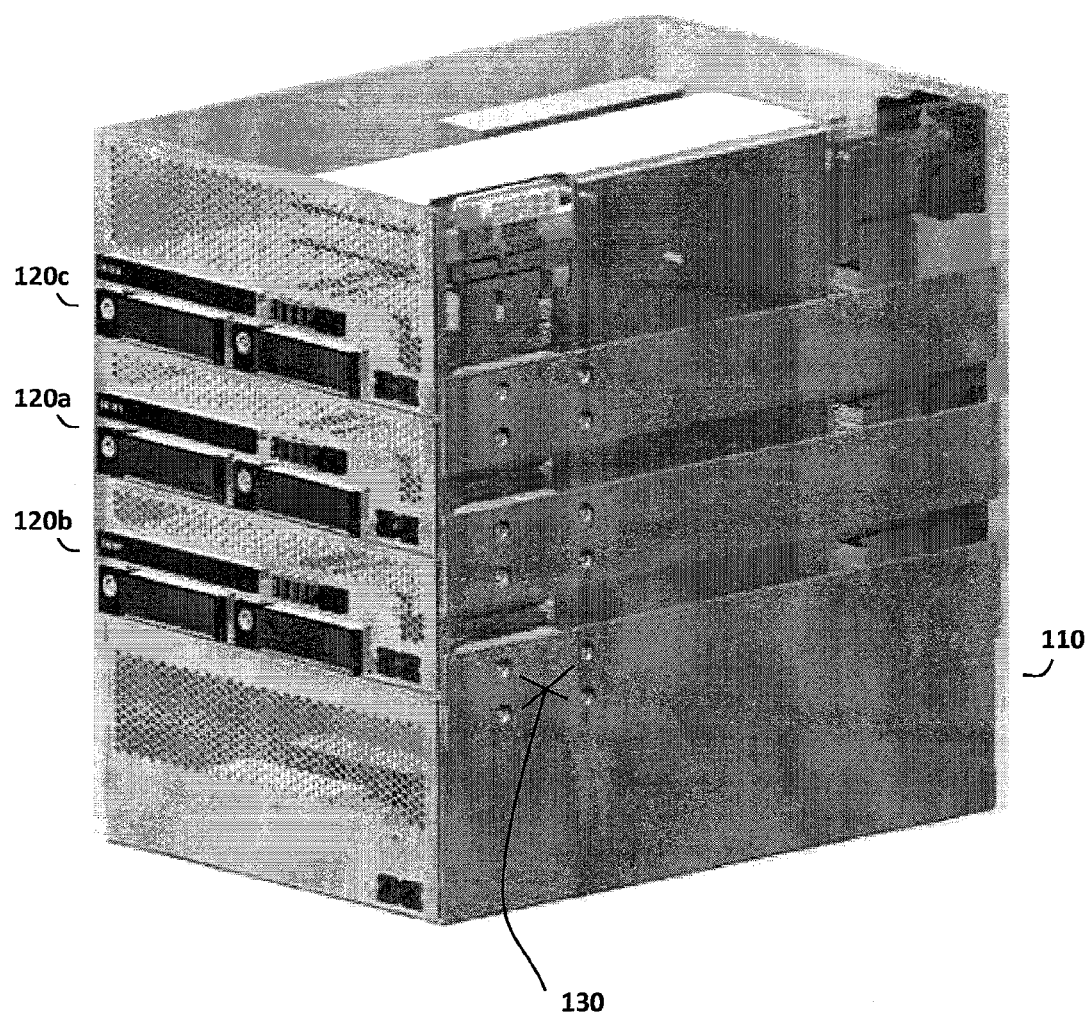
FIG. 1 illustrates an exemplary industrial design associated with the adaptive computing system described herein, according to one aspect of the invention.

According to one aspect of the invention, FIG. 1 illustrates an exemplary industrial design 100 associated with the adaptive computing system described herein. In particular, the industrial design 100 may generally address concerns relating to power consumption and thermal output in small areas, physical dimensions suitable in limited work spaces, cable management, easy assembly, deployment, and service, low initial cost, among other factors that relate to user needs to deploy multiple computers in a work space. For example, in one implementation, the industrial design 100 shown in FIG. 1 may permit users to deploy one or more computer modules 120 having different processor and memory configurations to meet different computing needs and identical motherboards to simplify deployment. Furthermore, relative to traditional desktop computers, the industrial design 100 may allow users to realize savings in the deployment space, power consumption, and thermal output associated with the adaptive computing system, among other factors relevant to deploying multiple computers in a particular work space. Moreover, the industrial design 100 may make the adaptive computing system convenient to operate, especially to users that may have previously interconnected standalone desktop computers via keyboard-video-mouse (KVM) switches to realize multiple desktop computing solutions. In one implementation, the industrial design 100 may generally enable users to deploy a vertical stack having multiple computer modules 120a-c, which may represent compact, high-density, and independent computing solutions. For example, in one implementation, the industrial design 100 may include various building blocks that may be utilized to construct the stack in a manner that meets the particular needs associated with any particular user, including a base module 110 to provide common power supply and Ethernet-Control-KVM (ECKVM) switching to the entire stack. In addition, the building blocks may include one or more power and ECKVM backplanes having mechanical and electrical interconnections to stabilize the various computer modules 120 in the stack and carry power signals and ECKVM switching signals to and from the base module 110. In one implementation, as will be described in further detail below, the adaptive computing system may further include a remote control to operate the stack, the ECKVM switching functionality integrated therein, and any computer modules 120 deployed therein.

In one implementation, any computer module 120 deployed on the stack may have a discrete power supply, or alternatively draw power from the common power supply in the base module 110. For example, any particular user or customer may require the discrete power supply to address security concerns, reduce a risk associated with trusting one power supply for all computer modules 120 in the stack), or meet increased power requirements associated with one computer module 120 that may not necessarily justify the cost associated with adding a larger power supply to the base module 110 (i.e., because the discrete power supply may cost less than a combined cost associated with the common power supply and the power backplane). As such, in cases where a particular computer module 120 has a discrete power supply, the computer module 120 may function like a stand-alone personal computer with a small form-factor (i.e., without necessarily being connected to the base module 110, which would simply include a small auxiliary power supply to power the underlying infrastructure associated with the ECKVM switch and the power and ECKVM backplanes). Further, to provide a cost effective discrete power solution without substantially increasing the overall volume or size associated with a housing that encloses the computer module 120, the discrete power supply may include a Flex Advanced Technology Extended (ATX) form-factor, an EPS1U form-factor, or any other appropriate form-factor that can support power supplies with outputs between approximately 220 and 550 watts. Alternatively, where a particular computer module 120 does not have a discrete power supply, the computer module 120 may draw power from the common power supply enclosed in the base module 110 to optimize power consumption throughout the stack. Further, in deployments with one independently functioning computer module, the common ECKVM switching functionality may be considered optional (i.e., because there would not be multiple computer modules to switch among).

In one implementation, the industrial design 100 shown in FIG. 1 may include small, rectangular housings to enclose the base module 110 and the power and ECKVM backplanes integrated therein, and the computer modules 120 deployed in the stack may further be enclosed within housings having a substantially similar and consistent appearance. In one implementation, electrical interconnections in the power and ECKVM backplanes may be used to electrically connect the base module 110 and the computer modules 120 (e.g., as will be described in further detail below in connection with FIG. 2), while the housings may include various tool-less mechanical alignment and securing mechanisms 130 to mechanically connect and secure the base module 110 to the computer modules 120 in the vertical stack. Further, computer modules 120 having different configurations or capabilities may be deployed in the stack, wherein the computer modules 120 may have identical widths and depths to simplify deployment in the stack (e.g., approximately 290 millimeters wide and 320 millimeters deep), while different heights may provide users with options to vary the physical space that the stack occupies (e.g., the computer modules 120 may have small, slim, and/or large configurations, which may have approximately 85, 100, and 180 millimeter heights, respectively). In one implementation, the base module 110 may have a form-factor with physical dimensions that correspond to the large computer module 120 configuration (i.e., a 290 millimeter width, a 320 millimeter depth, and a 180 millimeter height). Accordingly, because the stack may have various possible heights, the industrial design 100 may ensure that the stack will be sufficiently stable to remain upright and tolerate forces exerted on the upper computer modules 120 without falling over, thereby mitigating possible data loss and injury risks. Moreover, because the base module 110 and the computer modules 120 will be vertically stacked, the base module 110 and the computer modules 120 may have no lids, except that the last (or highest) computer module 120 on the stack may have a lid (i.e., the bottom on any module above another module may be the lid associated with the below module, whereby only the last or highest computer module 120 may need to have a lid).

For example, in one implementation, the base module 100 may be designed to stabilize the stack and prevent accidental shock or potential injuries to end users. For example, because the stack may include multiple computer modules 120, certain deployments may require the base module 100 to supply 1.5 kW into the stack. Accordingly, the base module 110 may include various mechanical and electrical lockouts that can prevent powering on the stack while a lid (not shown), the computer modules 120, or other components are removed or improperly seated, and similarly, the design may prevent installing the backplanes until the base module 110 and any computer modules 120 have been properly installed. Further, independent product safety certification organizations, such as Underwriters Laboratories Inc. ("UL"), may document and test the safety design and various quality control processes may be employed during manufacturing to check and validate that the safety lockouts function properly. Furthermore, the housing associated with the base module 110 or any computer module 120 deployed in the stack may comprise a tool-less chassis, which may simplify assembling and servicing the stack, while further strengthening and stabilizing the stack. As such, the industrial design 100 may enable users to install and remove components in the base module 110 and any computer modules 120 without any tools. Moreover, the tool-less chassis design may be designed to disengage certain modules from the mechanical retention mechanisms to allow easy removal in order to ensure safety and quality (e.g., because a user unlocking the lid or another housing may potentially move levers or other mechanical objects in the stack, the tool-less chassis design may disengage the modules to allow easy installation and removal).

In one implementation, the industrial design 100 may further manage thermal output to maintain low noise profiles and ensure that individual computer modules 120 deployed therein perform similarly to a system housed in a large chassis. For example, the industrial design 100 may have various heat pipes move thermal mass to different locations within the chassis, and various fans may be specifically positioned to target airflow and redirect heat (e.g., the heat pipes may channel heat to a radiator, while the fans may be situated to target airflow from the front of the base module 110, through the radiator, and towards the rear of the base module 110, where the heat may be exhausted). In one implementation, the heat pipe design may similar to commonly used commercial laptop solutions, while the fan design may be similar to commonly used commercial server solutions, which can maintain substantial thermal mass in vertically stacked deployments. Further, any individual computer module 120 in the stack may employ the thermal management design to handle thermal mass originating therein, and the thermal management design may be tested in elevated temperature environments or other conditions to model scenarios where the stack may be deployed on the floor, in a corner, or another tight space (e.g., based on the "Department of Defense Test Method Standard for Environmental Engineering Considerations and Laboratory Tests," known as United States Military Standard MIL-STD-810G). As such, the thermal management design may combine practices that have previously been limited to managing thermal output in other computer contexts, which may allow the industrial design 100 to package high performance technology in substantially less volume than otherwise required in standard mini-tower desktops.

In one implementation, the industrial design 100 may further provide stability, safety, performance, and easy assembly and service. For example, to reflect that desktop computers tend to represent user personalities and image, the industrial design 100 may include color, form-factor, and other design considerations that generally revolve around quality, innovation, integration, and green technology themes to fit within personal environments. In particular, every module, cable, shipping box, or other material used in the industrial design 100 may communicate value, including buttons that users will touch and feel. As such, the industrial design 100 may include tight fitting connectors, housings constructed with hard plastics and smooth finishes to convey image, and front panels to conceal otherwise exposed devices and provide a consistent and organized appearance. Further, in closed positions, the front panels may preserve the consistent and organized appearance, wherein post-market off-the-shelf devices may be installed in the stack without causing a dissimilar appearance, and different computer modules 120a-c may have different front panels having different finish colors to identify different characteristics (e.g., different classification domains) associated with the computer modules 120a-c. As such, different colors or other finishes may visually associated a particular computer module 120 and operating environment to enable users to quickly distinguish one computer module 120 from another computer module 120, which may further aid support personnel to conduct security audits, install upgrades, and otherwise manage the different computer modules 120a-c. In one implementation, buttons on the remote control that are associated with the various computer modules 120a-c may have colors or other finishes that match the different computer modules 120, which may deliver additional indicators to help users avoid mistakes when switching among the computer modules 120 using the remote control.

Furthermore, the industrial design 100 may eliminate brominated flame retardant (BFR) from all circuit boards, eliminate polyvinyl chloride (PVC) from all cables, have recyclable mechanical materials, and substantially reduce packaging and shipping materials, among other environmental benefits. As such, the industrial design 100 may meet or exceed environmental performance criteria sufficient to achieve Electronic Product Environmental Assessment (EPEAT®) Gold certification (e.g., as described in "IEEE Standard 1680.1, Section 4-Environmental Performance Criteria for Desktop Personal Computers, Notebook Personal Computers and Personal Computer Displays," the contents of which are hereby incorporated by reference in their entirety).

Accordingly, the industrial design 100 associated with the adaptive computing system that will be described in further detail herein may allow multiple independent computer modules 120 to deployed in the stack and combine various elements traditionally associated with personal desktop computer designs with best-in-breed technologies associated with various laptop and server markets (e.g., small active fans, heat pipes, mechanical and electrical interconnection solutions, etc.). As such, the overall industrial design 100 may allow various electronics that make up the stack to occupy less space than standalone commercial desktop computers while having comparable performance density to current server solutions, whereby the adaptive computing system to be described in further detail herein may create a new desktop computer paradigm that addresses stability, safety, productivity, performance, easy assembly, easy service, and other factors important to modern and diverse user communities.

Figure 2:
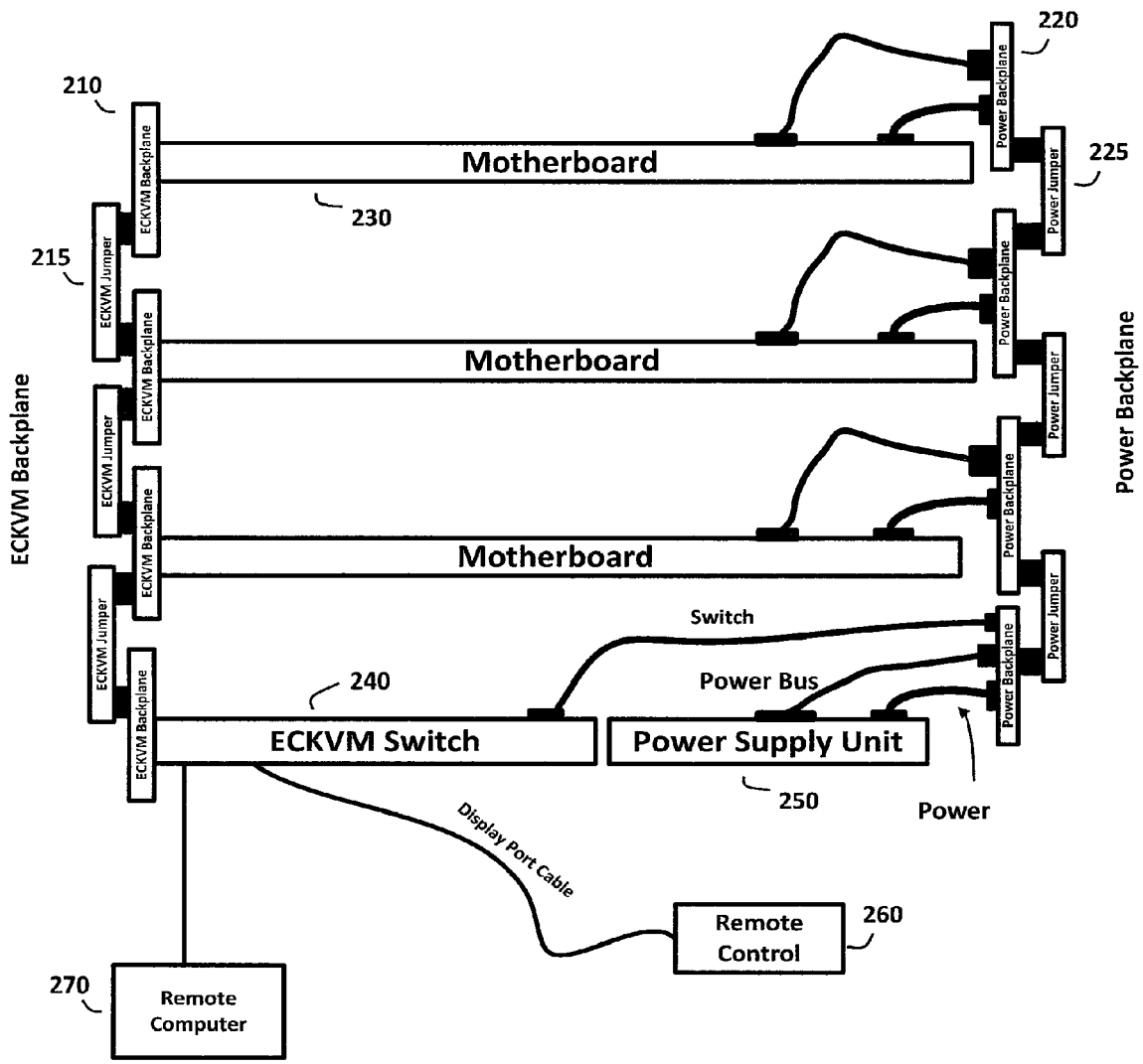
FIG. 2 illustrates an exemplary connection diagram associated with the adaptive computing system described herein, according to one aspect of the invention.

According to one aspect of the invention, FIG. 2 illustrates an exemplary connection diagram associated with the adaptive computing system described herein. In particular, the connection diagram shown in FIG. 2 may provide a platform having embedded infrastructure control systems to provide a modular approach and control architecture, which may allow users to safely assemble, upgrade, and otherwise manage computer modules deployed on the platform. For example, in one implementation, an integrated ECKVM switch 240 may simplify deployment and cable management to provide simple options to install and use the stack, a shared power supply unit 250 may be used to power various computer modules and otherwise optimize power management associated with various components in the stack, and identical motherboards 230 may be used in the computer modules to simplify deploying multiple computer modules in the platform. Thus, as will be described in further detail herein, the connection diagram shown in FIG. 2 may provide a modular control, switching, and power supply architecture, which may include various building blocks that may be utilized to assemble the various computer modules in the stack in a manner that meets the particular needs associated with any particular user.

In one implementation, the modular control, switching, and power supply architecture may generally include a base module having a common power supply unit 250 to supply power to the entire stack, an ECKVM backplane 210 to carry signals associated with Ethernet, infrastructure control, and KVM (e.g., display, audio, USB, etc.) to manage the stack, and a power backplane 220 to carry power from the common power supply unit 250 to the computer modules deployed in the stack. In one implementation, the power backplane 220 may carry power from the common power supply unit 250 to the various computer modules in the stack, wherein one or more power backplane jumper cards 225 may connect one or more power bus and power supply lines on the common power supply unit 250 to the power backplane cards 220 on the various computer modules. Similarly, the ECKVM backplane 210 may include one or more cards that can be vertically installed to connect various computer modules in the stack, wherein one or more ECKVM jumper cards 215 may connect the ECKVM backplanes 210 associated with different computer modules to one another. Furthermore, the ECKVM backplane 210 may connect to an ECKVM switch 240 in the base module, wherein the ECKVM switch 240 may include a common printed circuit board having independent switching circuitries associated with Ethernet, infrastructure control, and/or KVM. Additionally, in one implementation, the architecture may further include a remote control 260, which may connect to the ECKVM switch 240 via a display port cable to operate the computer modules deployed in the stack and the ECKVM switch 240. For example, as will be described in further detail below, the ECKVM switch 240 may include a master controller, which may include circuitry to control the stack and communicate with the remote control 260 via various control signals. Furthermore, in one implementation, the various computer modules may include identical motherboards 230 to ease deployment within the stack.

In one implementation, the connection diagram shown in FIG. 2 may generally have a flexible configuration, while can function properly with one base module at the bottom of the stack and a certain number computer modules (e.g., three) arranged above the base module within the stack. In one implementation, any particular computer module deployed in the stack may have a discrete power supply (i.e., without necessarily being connected to the common power supply unit 250), in which case the common power supply unit 250 may only supply auxiliary power to the ECKVM switch 240 and the master controller associated therewith. Alternatively, any computer module deployed in the stack may draw power from the common power supply unit 250 via the power bus and power supply lines. However, if any computer modules share the common power supply unit 250, the architecture may require the power backplane 220 and associated jumper cards 225 to supply power to the computer modules that are sharing the common power supply unit 250. Furthermore, if the stack has been deployed with the remote control 260 or with the ECKVM switch integrated into the base module, the ECKVM backplane 210 and associated jumper cards 215 may be required to enable controlling the stack via the remote control 260 and to enable ECKVM switching functionality within the stack. However, if every computer module has been deployed to independently operate with a discrete power supply unit and user interface, the common power supply unit 250, the power backplane 220 and associated jumper cards 225, the ECKVM backplane 210 and associated jumper cards 215, and the ECKVM switch 240 may not be required (i.e., the stack may be considered a collection that includes multiple independent computer modules that do not necessarily share any common resources).

In one implementation, a remote computer module 270 having a discrete power supply may be situated outside and apart from the stack. For example, security reasons may require certain users to have certain computer modules located a certain distance (e.g., thirty-six inches) away from the stack in order to comply with legacy security requirements that restrict physical proximities associated with computers having different security classifications. As such, despite being situated apart from the stack and having a discrete power supply independent from the common power supply unit 250, the remote computer module 270 may share the ECKVM switch 240, and the remote control 260 may similarly control the remote computer module 270. For example, to enable deploying the remote computer module 270, the ECKVM switch 240 may include various connectors (e.g., to display, USB, audio, Ethernet, microphone, and other ports), which can be used to connect the remote computer module 270 to the base module via commercial off-the-shelf (COTS) cables. Further, in one implementation, the remote computer module 270 may always assume a lowest logical position (e.g., fourth) in the stack even if additional computer modules are not deployed in the stack (e.g., to ensure that the control architecture can appropriately manage any security or other requirements associated with the remote computer module 270). As such, the connection diagram shown in FIG. 2 may generally support the remote computer module 270 in addition to any other computer modules that can be deployed therein (e.g., the architecture may support the remote computer module 270 in addition to the maximum number of computer modules that can otherwise be supported).

In one implementation, the connection diagram used in the adaptive computing system may eliminate many cables that would otherwise be required to deploy a multiple desktop computer solution. In particular, the mechanical and electrical integration employed in the connection diagram may enable video, audio, and other signal cables to be moved to the ECKVM switch 240 to integrate Ethernet, infrastructure control, KVM, and other switching functionality into the base module and improve cable management without substantially degrading cabling quality. For example, in one implementation, the ECKVM switch 240 may route display, USB, audio, and other input/output signals from any particular computer module deployed on the stack to common output connectors on the integrated ECKVM switch 240, which may be shared with any computer module deployed on or connected to the stack. In one implementation, controls associated with the ECKVM switch 240 may be situated on the remote control 260 to ensure reliably connecting the computer modules to the ECKVM switch 240 and guarantee that mistaken switching will not occur. For example, the ECKVM switch 240 may have a board that directly mounts connectors associated with display, keyboard, mouse, microphone, speaker, and other input/output or console devices, wherein a rear panel associated with the base module may provide access to the mounted connectors that may be used to connect the various input/output or other console devices to the ECKVM switch 240. As such, the remote control 260 may allow users to manage power associated with any computer module in the stack and switch among any computer modules that are operational via the ECKVM switch 240, wherein one switch cable may connect the base module to the ECKVM switch 240, which may be connected to the remote control 260 via a display port cable, thereby substantially eliminating the cables needed to control the stack.

Figure 3:
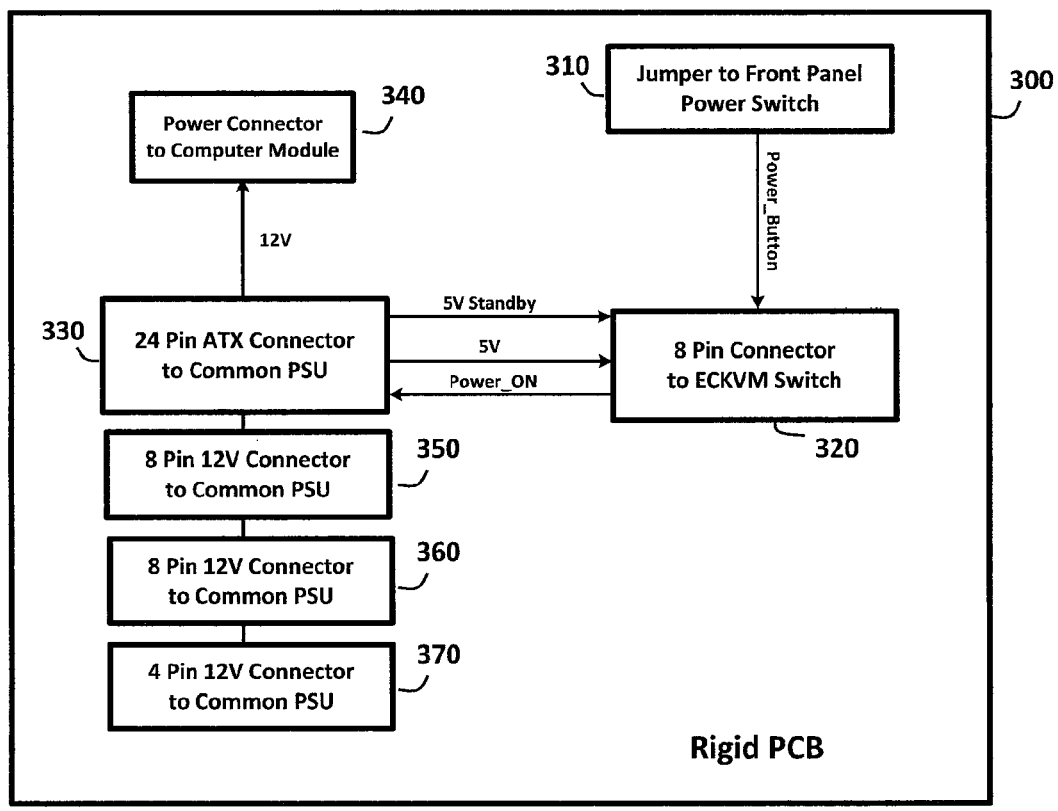
FIG. 3 illustrates an exemplary power backplane associated with the adaptive computing system described herein, according to one aspect of the invention.

According to one aspect of the invention, FIG. 3 illustrates an exemplary power backplane associated with the adaptive computing system described herein. In particular, as described above, the base module may provide power and optional control and optional backup uninterruptible power supply to the adaptive computing system, wherein the control provided with the base module may generally include ECKVM switching functionalities. For example, because the adaptive computing system may permit one or more computer modules to be deployed and operated independently from the base module, the base module may not need the KVM switch or the ECKVM switch to control the computer modules. However, if the computer modules are connected to the base module, the optional KVM switch and/or the optional ECKVM switch may be included in the base module to provide the infrastructure control via the master controller associated therewith. Furthermore, in deployments where the computer modules have discrete power supplies, the computer modules may operate independently and thereby optionally eliminate the base module from the stack, in which case the stack may only include mechanical interlocking mechanisms associated with the base module with electrical components optionally omitted. However, in deployments where the computer modules do not have discrete power supplies or are otherwise integrated with the base module and the ECKVM and power backplanes associated therewith, the base module may be mounted at the bottom of the stack and have a form-factor similar to the computer modules. Accordingly, because the stack may have a common only, auxiliary and discrete, and/or common and discrete power supply configuration, the power backplane may ensure that identical mechanisms are used to power on the entire stack or individual computer modules across the different power supply configurations.

For example, in one implementation, the power backplane in the base module may include a rigid printed circuit board 300 (i.e., because the base module has a standard height and form-factor). In one implementation, the power backplane may receive power from the common power supply and deliver the power to all computer modules in the stack via the interconnection shown in FIG. 3. In particular, the circuit board 300 associated with the power backplane may include a power backplane jumper card or connector 340, which may connect the power backplane in the base module to the power backplane in the computer module deployed above the base module (see elements 220 and 225 in FIG. 2). In one implementation, to mate with connectors on the common power supply unit, the circuit board 300 associated with the power backplane may include a connector 330 having twenty-four pins to receive power from a twenty-four pin connector on the common power supply unit, connectors 350 and 360 having eight pins to receive power from corresponding twelve volt connectors on the common power supply unit, and connector 370 having four pins to receive an additional twelve volts from a high power common power supply unit. In addition, the connector 330 may be coupled to the ECKVM switch via a connector 320, which may have eight pins to send five-volt standby (+5VSB) power, five volt (5V) power, and control signals (e.g., Power_ON) to the ECKVM switch. In one implementation, in response to a user pressing a power button on the front panel associated with the base module, a jumper 310 to the front panel power switch may send a Power_Button signal to a microcontroller in the ECKVM switch via the connector 320, wherein the microcontroller may then drive the Power_ON signal to the connector 330, which may turn on the power supply unit. Alternatively, the user can press a master power button on the remote control to turn on the power supply unit, in which case the remote control may send the Power_Button signal to the microcontroller. Moreover, as will be described in further detail below, the design associated with the ECKVM backplane and master controller may reflect the power mechanisms used in the power backplane to avoid confusing users performing simple tasks that relate to powering the stack on and off, and the connector 330 may further send twelve volts to power the computer modules deployed above the base module via power connectors 340 that connect the power backplane in the base module to the power backplane in the computer modules deployed above the base module.

In one implementation, the power supply unit associated with the base module power backplane may alternatively include a value power supply or a performance power supply. For example, in one implementation, the value power supply may include an entry-level solution having one power supply connected in series and designed to have at least similar efficiency to currently used desktop power supplies, and preferably sufficiently efficient to receive certification under the 80 PLUS® initiative (e.g., as described in "Defining Efficiency in a Rapidly Changing World Specifications and Incentives for High Performance Data Centers and High Efficiency IT Equipment," the contents of which are hereby incorporated by reference in their entirety). In one implementation, the value power supply may provide from 350 watts to 1350 watts in total power output, whereby the largest power capacity (i.e., 1350 watts) may be used to power up to three computer modules in the stack that have typical configurations without exceeding eighty percent capacity. Alternatively, the performance power supply may function similarly to commercially available redundant power supplies currently used in the server market, wherein the performance power supply may have modular design that include a power distribution unit, a mechanical frame, and two removable power supply modules to provide users with flexibility in managing power output. For example, the performance power supply may integrate the power distribution unit and the mechanical frame into the chassis associated with the base module, wherein users may simply slide a selected one of the removable power supply modules into the frame. As such, the performance power supply design may allow removable power supply modules with capacities from 500 watts to 750 watts, and may support "redundant" and "strapped" modes. For example, in the strapped mode, the two removable power supply modules may collectively output up to 1,500 total watts, allow deploying removable direct current power supply modules, and permit the power supply to be conveniently upgraded (e.g., the user may "hot-swap" one removable module with another while the power supply operates in the redundant mode, while the strapped mode may require a "cold-swap"). Furthermore, in one implementation, the performance power supply (and/or high capacity value power supplies) may include a Power Management Bus (PMBus) interface that can obtain information relating to capacity associated with the power supply.

In one implementation, the power supply may feed power to the power backplane, which in turn powers every module and other device in the stack. In one implementation, the power backplane may have a design that mitigates inadequacies in the current that commercial off-the-shelf power supplies output on the +5VSB rail, which may be insufficient to power the master controller, the remote control, embedded motherboard controllers and CMOS memory devices, and other infrastructure components associated with the adaptive computing system. For example, the power backplane may enable the stack to enter a power saving mode while no computer modules are turned on, in which case the common power supply may be turned off and the +5VSB rail may be used to power the underlying infrastructure associated with the adaptive computing system (i.e., only the master controller and the remote control). In other words, while the stack operates in the power saving mode, the embedded motherboard controllers on the computer modules may not receive any power from the power backplane, and the CMOS memory devices may receive alternate power supplies (e.g., via a battery residing on the motherboard). However, because the embedded motherboard controllers are non-operational in the power saving mode, the computer modules in the stack may not Wake-on-LAN or perform other management features that require an operational power supply in the power saving mode. Alternatively, while the stack does not operate in the power saving mode, the common power supply may be always-on (even if all computer modules on the stack are not powered on), in which case the twelve volt direct current (+12VDC) rail may be converted to a five volt direct current (+5VDC) rail to power all embedded motherboard controllers, CMOS memory devices, and any other devices in the stack that may otherwise receive power from the +5VSB rail in a commercial off-the-shelf desktop system. In this case, the computer modules may Wake-on-LAN and perform other management features (e.g., in accordance with vPro motherboard technology), whereby the computer modules may operate similarly to a typical powered off desktop computer while only drawing +5VSB from the power supply. Alternatively, as noted above, a common power supply may not be needed if every computer module has a discrete power supply, in which case the power backplane may include an auxiliary power supply to provide the +5VDC source to the infrastructure, in which case the embedded motherboard controllers may draw power from the discrete power supplies.

Figure 4:
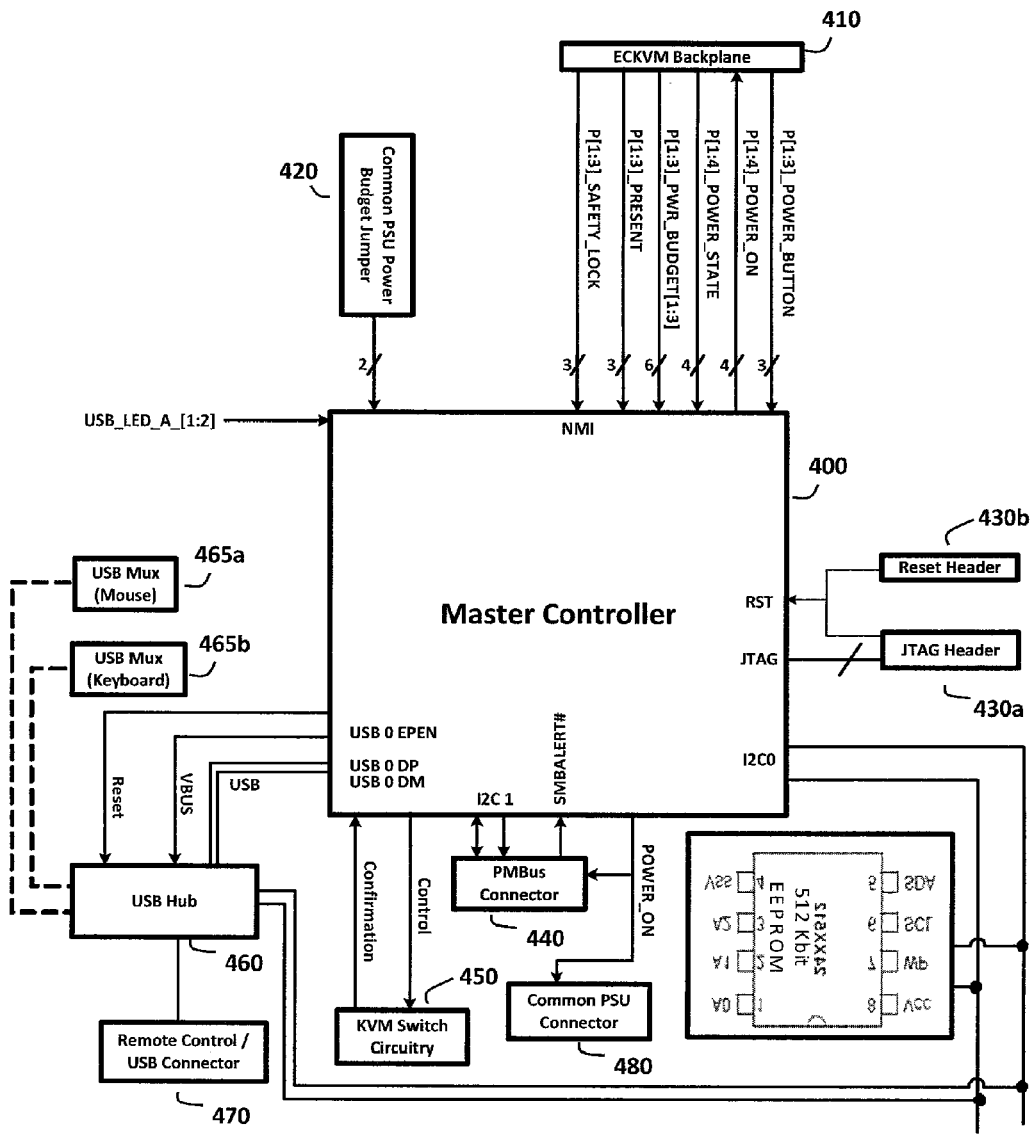
FIG. 4 illustrates an exemplary master controller associated with the adaptive computing system described herein, according to one aspect of the invention.

According to one aspect of the invention, FIG. 4 illustrates an exemplary master controller 400 associated with the adaptive computing system described herein, wherein the master controller 400 may be provided in the KVM (or ECKVM) switch associated with the base module. In particular, as mentioned above, the master controller 400 may manage the underlying infrastructure associated with the adaptive computing system. In one implementation, the master controller 400 may generally include a simple, reliable, and resilient processor-based board mounted in the base module, and may execute firmware specific to the functionality provided therein. Furthermore, in one implementation, the master controller may include a Joint Test Action Group (JTAG) debug header 430a that may connect a JTAG port on the master controller 400 to a download cable, which may be used to upgrade the firmware, establish parameter settings, and otherwise manage the functionality associated therewith. Additionally, the JTAG debug header 430 and a reset header 430b may be used to easily reset the master controller 400, while power supply unit power budget jumpers 420 may ensure that the master controller 400 will draw minimal power from the power supply unit and avoid imposing a heavy burden on the +5VSB rail. In particular, the master controller 400 may read values associated with the power budget jumpers 420 to determine a capacity associated with the common supply unit and determine power draw requirements associated with every dependent module in the stack, including the master controller 400 itself.

For example, in one implementation, the master controller 400 may obtain the capacity associated with the power supply unit via a PMBus connector 440, or in deployments that do not have a PMBus, a common power supply unit connector 480 may provide a built-in switch (preferably rotary) between the common power supply and the power backplane to provide the capacity. Furthermore, because the master controller 400 may be the only master on the PMBus, the power draw that each module on the stack requires can be supplied on the SMBALERT# signal that all PMBus devices use to send notification events on the PMBus, including the computer modules deployed on the stack. As such, in response to determining the capacity associated with the power supply unit and the power draw requirements associated with every module on the stack, the master controller 400 may ensure that all computer modules on the stack do not draw collective power that exceeds the capacity associated with the common supply unit. For example, during power-up sequences, the master controller 400 can make decisions to ensure that the collective power demand does not exceed the capacity associated with the common power supply, and an error may be generated if the common power supply unit cannot provide sufficient power output to meet the requirements (e.g., visually via an LED indicator or LCD screen associated with the remote control and/or audibly via speakers or other audio output devices).

Furthermore, in one implementation, the master controller 400 may provide further power management functions associated with the stack, which may include powering the various components and modules in the stack on and off and enforcing power down priority settings should the stack be operating on an uninterruptible power supply. For example, if the optional uninterruptible power supply provides backup battery power to the stack, the base module may have an interface that connects to the uninterruptible power supply, which may be mounted either inside or below the base module. In one implementation, the interface may be exposed in a manner that enables end user installation, although trained technicians may be preferred due to safety concerns associated with handling batteries. Thus, the uninterruptible power supply may support operating the stack once installed (e.g., if the common power supply unit fails or suffers degraded performance), and may ensure that operating systems associated with the computer modules successfully and orderly shut down the computer modules in the stack. In particular, the master controller 400 may manage having the associated operating systems shut the computer modules down and enable users to establish priorities to shut down the computer modules while the uninterruptible power supply provides battery power (e.g., a computer module having a highest or most critical priority may operate on battery power from the uninterruptible power supply longest, and therefore be shut down last). As such, users may flexibly manage priorities associated with running the computer modules on the battery power associated with the uninterruptible power supply and further control the stack.

In one implementation, the master controller 400 may further use an Inter-Integrated Circuit (I$^2$C) bus to communicate with EEPROM devices and a USB hub 460, wherein the master controller 400 may be the only master on the I$^2$C bus, while one or more I$^2$C multiplexers 465 may be used to expand the I$^2$C bus to other hubs (e.g., hubs associated with USB mouse and keyboard devices). Further, the master controller 400 may receive various signals from the ECKVM backplane 410 that enable managing and monitoring the safety interlock systems described above. In particular, a backplane safety lock signal (e.g., P[1:3]_SAFETY_LOCK) may interrupt the master controller 400 to indicate whether or not all the safety locks are closed, wherein the master controller 400 may turn the common power supply unit off while at least one safety lock remains open. Additional functions provided in the master controller 400 may include, among other things, managing the remote control through a USB interface 470 (e.g., displaying messages on the LCD screen associated with the remote control) and instructing KVM switch circuitry 450 to switch the KVM (e.g., the master controller 400 may set output bits on a control path in response to a user activating a different computer module, and input bits on a confirmation path may indicate whether or not the KVM was successfully switched).

Figure 5A:
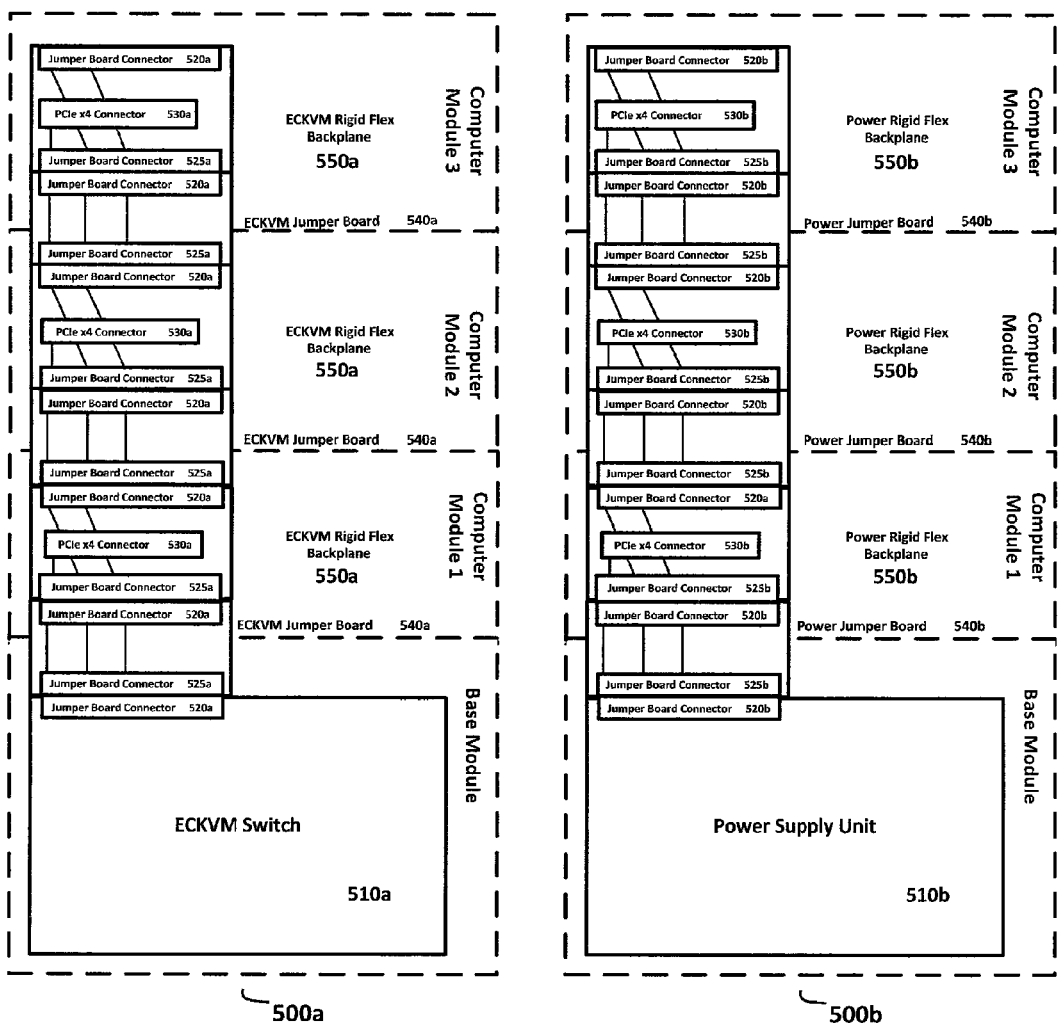
FIG. 5A illustrates an exemplary side view and FIG. 5B illustrates an exemplary front view associated with a backplane topology that may be used in the adaptive computing system described herein, according to one aspect of the invention.
Figure 5B:
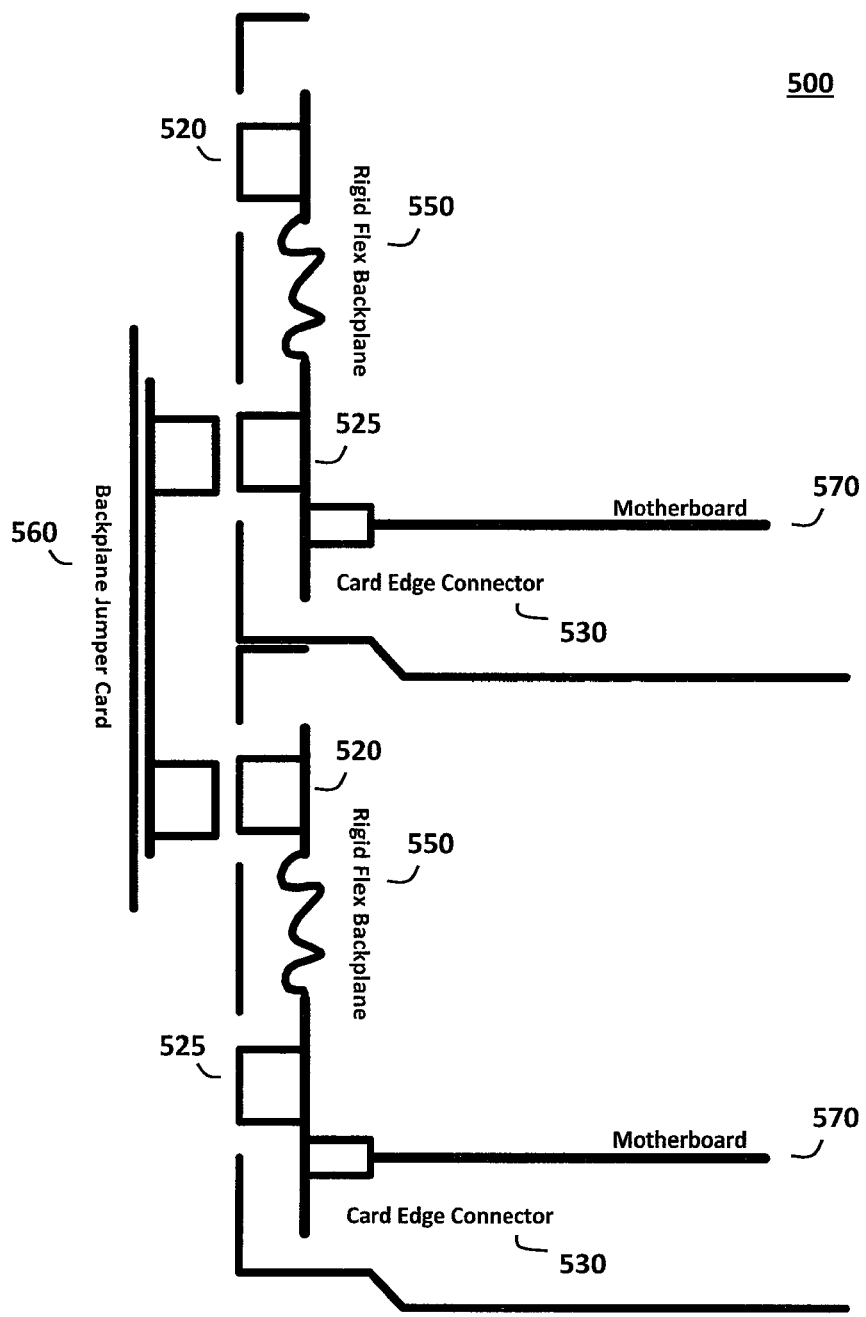

According to one aspect of the invention, FIG. 5A illustrates an exemplary side view and FIG. 5B illustrates an exemplary front view associated with a backplane topology that may be used in the adaptive computing system described herein. In particular, as noted above, the stack associated with the adaptive computing system may include an Ethernet-Control-Keyboard-Video-Mouse (ECKVM) backplane 500a to connect Ethernet, infrastructure control, and KVM (i.e., display, USB, audio, etc.) signals from any computer modules that may be deployed in the stack to an ECKVM switch 510a in the base module, and the stack may further include a power backplane 500b to deliver power signals from a power supply unit 510b in the base module to the computer modules deployed in the stack. In one implementation, as will be described in further detail herein, the ECKVM backplane 500a and the power backplane 500b may be designed to reliably transport the ECKVM switching and power signals throughout the stack, and further to protect integrity associated with the signals transported throughout the stack. Moreover, in one implementation, the ECKVM backplane 500a and the power backplane 500b may include mechanical housings designed to secure and protect various printed circuit boards that carry the transported signals throughout the stack, wherein the mechanical housings may further provide a primary mechanism to interconnect or otherwise hold together the base module, the computer modules, and any other modules deployed in the stack. However, in deployments with computer modules that operate independently from the base module and have discrete power supplies (i.e., the computer modules neither rely on switching functionality provided in the ECKVM switch 510a nor draw power from the common power supply unit slob), the ECKVM backplane 500a and the power backplane 500b may not necessarily be included in the stack.

In one implementation, because the adaptive computing system has a modular and stackable design, the stack may have different heights depending on how many computer modules are deployed therein and further depending on whether the deployed computer modules have the small, slim, and/or large configuration. Accordingly, in one implementation, the ECKVM backplane 500a and the power backplane 500b may have a modular daisy chain design (rather than an integrated design), which allows the ECKVM backplane 500a and the power backplane 500b to grow and contract with the stack, while rigid flex backplane boards 550 may be used to connect the transported signals to the deployed computer modules and ensure that the same ECKVM backplane 500a and power backplane 500b can accommodate the different possible heights associated with the deployed computer modules (i.e., small, slim, and large). However, because the base module has a standard height and form-factor, the ECKVM backplane 500a and the power backplane 500b may be connected to the base module using a conventional rigid printed circuit board, which may further stabilize the stack. Furthermore, as shown in FIG. 5A, the ECKVM backplane 500a may be located on one side of the stack and the power backplane 500b may be located on the other side of the stack, and motherboards 570 associated with the respective computer modules may have card edge connectors 530 that connect the computer modules to the ECKVM backplane 500a and the power backplane 500b. For example, in one implementation, the card edge connectors 530 may include Peripheral Component Express x4 (PCIe x4) connectors 530, which may provide a four-layer link between the motherboards 570 and the backplanes 500a-b (e.g., top and bottom layers to transport the signals and two middle layers connected to ground). Thus, the motherboards 570 associated with the respective computer modules may physically connect the ECKVM backplane 500a and the power backplane 500b located on opposite sides of the stack (e.g., via the card edge connectors 530 to the backplanes 500a-b, as shown in FIG. 5B).

As such, the modular daisy chain design described above may ensure that the ECKVM backplane 500a and the power backplane 500b collectively bear minimal weight. For example, as noted above, ECKVM rigid flex backplane boards 550a may connect the ECKVM signals to the motherboards 570 associated with the respective computer modules, and an ECKVM backplane jumper card 560 may interconnect the various computer modules. In particular, the ECKVM rigid flex backplane boards 550a have one jumper board connector 520a to connect with an above-located computer module and another jumper board connector 525a to connect with a below-located computer module, while the ECKVM switch 510a includes one jumper board connector 520a to connect with a lowest (or first) computer module in the stack. Similarly, power rigid flex backplane boards 550b may connect the power signals to the motherboards 570 and a power backplane jumper card 560 may interconnect the various computer modules, wherein the power rigid flex backplane boards 550b similarly have jumper board connectors 520a and 525b to respectively connect with the above-located and the below-located computer module, while the power supply unit 510b includes one jumper board connector 520b to connect with the lowest (or first) computer module in the stack. Further, in one implementation, pins associated with the jumper board connectors 520a and 520b on the ECKVM backplane 500a may be assigned to ensure that the ECKVM signals from any particular computer module will bypass all other computer modules in the stack and connect directly to the base module, wherein the ECKVM backplane 500a may receive the computer module ECKVM signals via the connections to the PCIe x4 connectors 530 on the motherboards 570.

In one implementation, as noted above, the ECKVM backplane 500a and the power backplane 500b may include mechanical housings to secure and protect the rigid flex backplane boards 550, the backplane jumper cards 560, and the associated connectors 520, 525, and 530 that transport the power and ECKVM signals between the base module and the various computer modules in the stack. In addition, the mechanical housings may further "bind" one module to another (e.g., adjacent computer modules, the base module and the lowest computer module, etc.). As such, the mechanical housings may be designed to have sufficient strength to rigidly hold or otherwise secure the stack during shipment to the customer, and moreover, to maintain the stack in a vertical and upright orientation once the customer has deployed the adaptive computing system. Further, because the ECKVM switch 510a and the common power supply unit 510b are optional components in the adaptive computing system, the mechanical housings may be independent from the electrical components that the housings protect, in which case the housings may simply provide latches to secure the stack. In one implementation, the mechanical housings may have little or no protrusion from the side of the computer modules, which may provide the stack with a more aesthetically pleasing appearance and strengthened structural integrity, especially while the stack may be enclosed in a packing carton during commercial transport. Moreover, in one implementation, the mechanical housings may enclose the safety interlock system described above, which may prevent powering on the stack unless the daisy chains associated with the ECKVM backplane 500a and the power backplane 500b are fully engaged and properly terminated, and which may further power down the stack if the daisy chains associated with the ECKVM backplane 500a and the power backplane 500b are opened.

Figure 6:
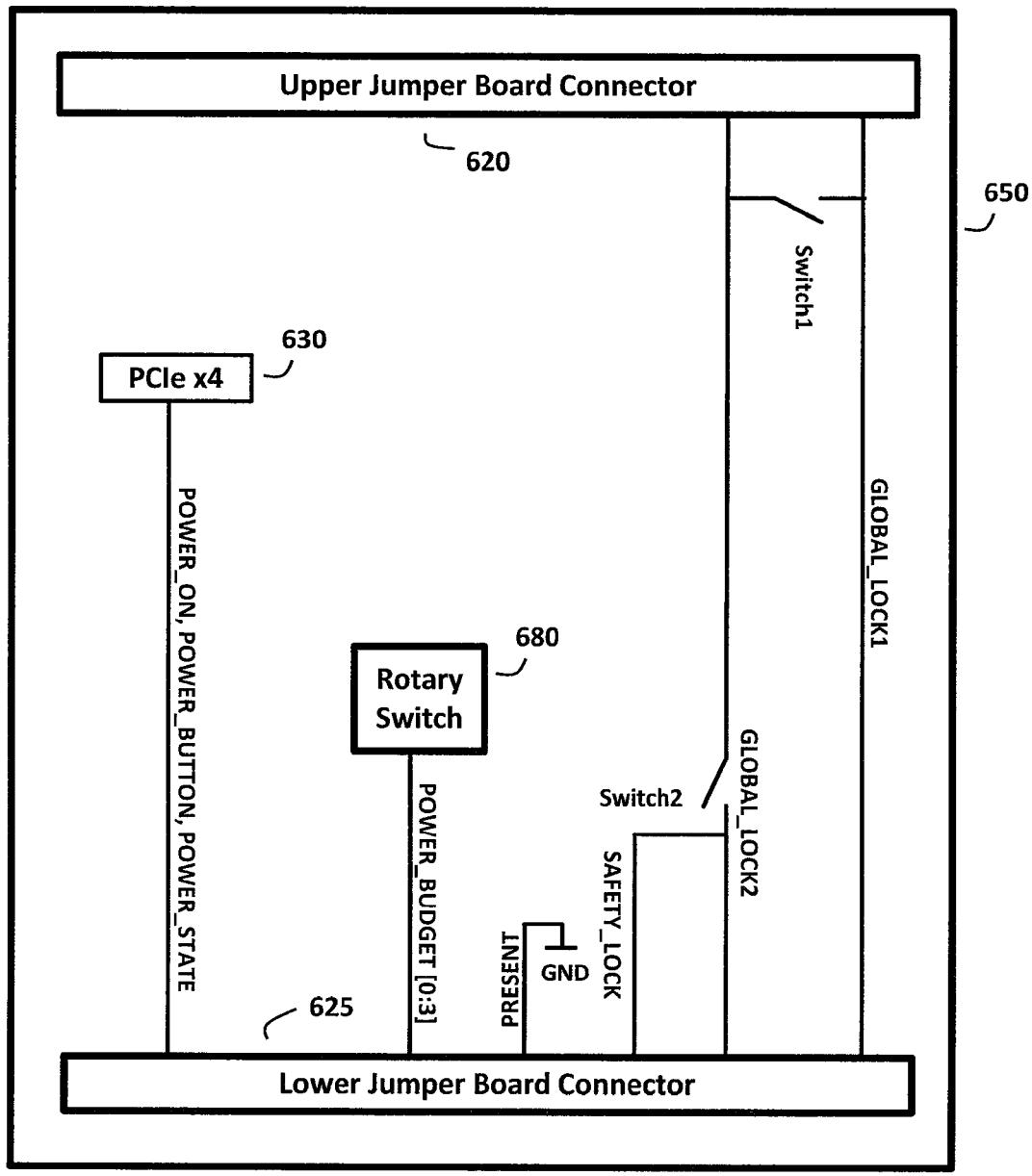
FIG. 6 illustrates an exemplary safety interlock system that may be used in the adaptive computing system described herein, according to one aspect of the invention.

For example, according to one aspect of the invention, FIG. 6 illustrates an exemplary implementation associated with the safety interlock system described above. In particular, as noted above, the adaptive computing system may generally include a base module and various computer modules deployed in a vertical stack, wherein the stack may optionally include a power backplane 650 to enable the various computer modules to share a common power supply unit in the base module. Furthermore, in one implementation, an optional ECKVM backplane 650 may transport ECKVM signals between the base module and the various computer modules. As such, in one implementation, the power backplane 650 may include connectors 620 and 625 to transport power signals from the power supply unit in the base module to the computer modules on the stack (e.g., system power signals and standby power signals), while the ECKVM backplane 650 may include similar connectors 620 and 625 to transport ECKVM signals between an ECKVM switch in the base module and the computer modules. Accordingly, to safely deploy the various computer modules and the base module in the vertical stack, the safety interlock system shown in FIG. 6 may be utilized to positively lock and secure the base module and the computer modules and create an integrated unit with sufficient strength and stability to be moved and shifted without damaging or stressing the connectors 620 and 625 or a housing that encloses the stack.

In one implementation, the power backplane 650 and the ECKVM backplane 650 may be used to mechanically connect the base module and the computer modules without causing substantial interference with the electrical components associated therewith, whereby the mechanical connections associated with the power backplane 650 and the ECKVM backplane 650 may handle an entire weight load associated with the stack during operation, handling, and transport. In particular, once the power backplane 650 and the ECKVM backplane 650 have been mechanically connected to the base module and the computer modules, the connectors 620 and 625 associated therewith may be inserted into receptacles located on opposing sides associated with the base module and the computer modules to complete electrical connections between the power backplane 650, the ECKVM backplane 650, the base module, and the computer modules. In one implementation, an interconnection sub-system may be mounted on opposing sides associated with the base module and the computer modules, which may include one connector 620 to the module located above and another connector 625 to the module located below, and the backplanes 650 may include the safety interlock system shown in FIG. 6 to mitigate a risk that inadvertent shock or system damage will occur.

For example, in one implementation, the safety interlock system may ensure that an uppermost computer module or lid has been correctly installed and that power and KVM connectors have been fully seated prior to permitting the stack to power up. Similarly, after the stack has powered on, any attempts to remove the base module, a computer module, the lid, or any connectors may cause an interlock actuation in the safety interlock system, which may then power down the stack. In particular, the safety interlock system may include a first switch (i.e., Switch1) to indicate whether or not the lid has been properly installed and locked, wherein the first switch may be closed when the lid has been properly installed and locked. In addition, the safety interlock system may include a second switch (i.e., Switch2) to indicate whether or not the lower backplane jumper board 625 has been properly installed and locked, wherein the second switch may be closed when the lower backplane jumper board 625 has been properly installed and locked. In one implementation, the first switch and the second switch may be wired in series throughout the stack, whereby one or more switches will be open and prevent powering on the stack (or cause the stack to power down) if the lid, the base module, any computer modules, or any connectors are not properly installed and locked. Furthermore, as described above in connection with FIG. 4, a master controller in the ECKVM switch may monitor signals associated with the safety interlock system and control distributing power to the various modules in the stack based on a status associated with the safety interlock signals (e.g., via a rotary switch 680). As such, the safety interlock system may protect against inadvertent shock or system damage, and may be designed to ensure that the switches controlling the interlock system cannot be easily disabled with general purpose tools.

Figure 7:
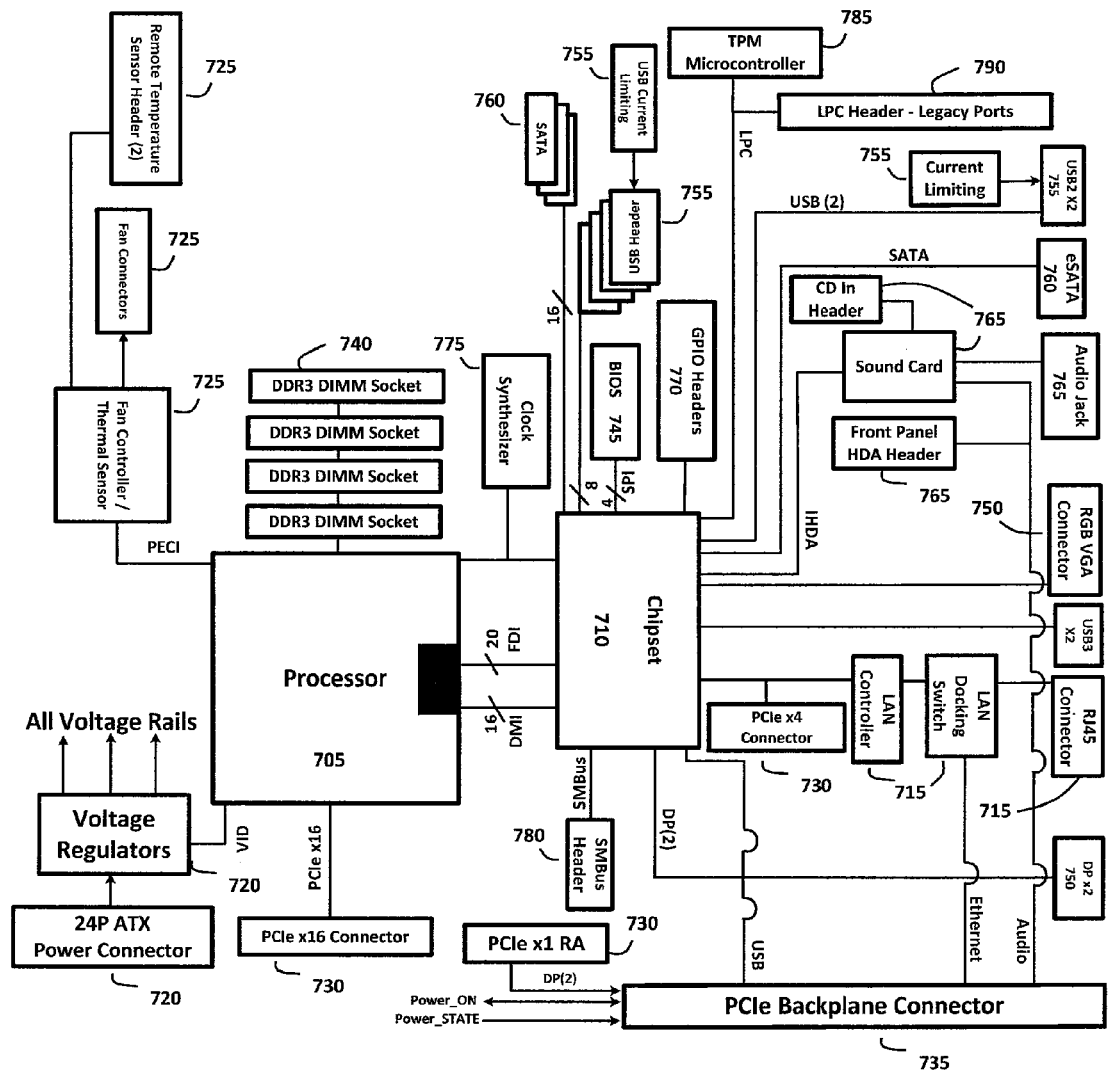
FIG. 7 illustrates an exemplary motherboard used in computer modules associated with the adaptive computing system described herein, according to one aspect of the invention.

According to one aspect of the invention, FIG. 7 illustrates an exemplary motherboard used in the computer module associated with the adaptive computing system described herein. In particular, as noted above, the adaptive computing system may generally permit deploying one or more computer modules in a stack, with any particular computer module in the stack providing independent computing functionality and optionally sharing a common power supply unit and ECKVM switching functionality provided in a base module. In one implementation, the computer modules may generally combine various traditional design elements in personal desktop computers with best-in-breed laptop and server technologies, whereby electronics that make up the computer modules may fit into smaller spaces than typical desktop computers while having performance density comparable to current server solutions. Furthermore, as noted above, the stack may include multiple computer modules having identical motherboards (e.g., to simplify deployment), although the multiple computer modules may have different processor and memory configurations to meet different computing needs. More particularly, in one implementation, the computer modules deployed in the stack may include slim, small, and/or large configurations, which may have the following exemplary technical specifications:

TABLE 1

| | SLIM COMPUTER MODULE | SMALL COMPUTER MODULE | LARGE COMPUTER MODULE |
|---|---|---|---|
| HARDWARE SPECIFICATIONS | | | |
| PROCESSOR | Intel Maho Bay Platform<br>Ivy Bridge 22 nm<br>95 Watt Maximum<br>Socket H2 | Intel Maho Bay Platform<br>Ivy Bridge 22 nm<br>95 Watt Maximum<br>Socket H2 | Intel Maho Bay Platform<br>Ivy Bridge 22 nm<br>95 Watt Maximum<br>Socket H2 |
| CHIPSET | Intel Maho Bay Platform<br>Panther Point PCH w/ vPro or<br>Panther Point PCH w/o vPro | Intel Maho Bay Platform<br>Panther Point PCH w/ vPro or<br>Panther Point PCH w/o vPro | Intel Maho Bay Platform<br>Panther Point PCH w/ vPro or<br>Panther Point PCH w/o vPro |
| MEMORY | Non-ECC Dual-Channel DDR3<br>1333 MHz<br>4 * DIMM, 16 GB Maximum | Non-ECC Dual-Channel DDR3<br>1333 MHz<br>4 * DIMM, 16 GB Maximum | Non-ECC Dual-Channel DDR3<br>1333 MHz<br>4 * DIMM, 16 GB Maximum |
| NETWORK | 10/100/1000 - required for vPro<br>Optional Third Party LAN<br>Optional PCIe Wireless LAN | 10/100/1000 - required for vPro<br>Optional Third Party LAN<br>Optional PCIe Wireless LAN | 10/100/1000 - required for vPro<br>Optional Third Party LAN<br>Optional PCIe Wireless LAN |
| GRAPHICS | Integrated Ivy Bridge Graphic | Integrated Ivy Bridge Graphic | Integrated Ivy Bridge Graphic |
| AUDIO | Onboard High-Def Audio Codec<br>Stereo Speaker w/Amplifier | Onboard High-Def Audio Codec<br>Stereo Speaker w/Amplifier | Onboard High-Def Audio Codec<br>Stereo Speaker w/Amplifier |
| STORAGE BUS | SATA 3 - 6 Gbit/S<br>Support RAID 0, 1, and 5 | SATA 3 - 6 Gbit/S<br>Support RAID 0, 1, and 5 | SATA 3 - 6 Gbit/S<br>Support RAID 0, 1, and 5 |
| INPUT/OUTPUT<br>*NOTE LEGACY<br>I/O OCCUPIES<br>ONE PCIE<br>SLOT | FRONT PANEL<br>2 * USB 3.0<br>1 * USB 2.0<br>1 * USB 2.0/eSATA Combo<br>1 * Line-out<br>1 * Microphone-in<br>REAR<br>2 * USB 3.0<br>2 * USB 2.0<br>2 * Display Port (1.1)<br>1 * VGA (15-Pin)<br>1 * RJ45<br>1 * Line-Out<br>1 * Microphone-In<br>OPTIONAL LEGACY I/O -<br>REAR PANEL*<br>1 * RS232 (DB9)<br>1 * PS/2<br>DISPLAY PORT LOOPBACK<br>2 * Display Port (1.1)<br>OTHERS<br>KVM Port x1<br>Power Backplane Port x1 | FRONT PANEL<br>2 * USB 3.0<br>1 * USB 2.0<br>1 * USB 2.0/eSATA Combo<br>1 * Line-out<br>1 * Microphone-in<br>REAR<br>2 * USB 3.0<br>2 * USB 2.0<br>1 * Display Port/HDMI Combo<br>1 * VGA (15-Pin)<br>1 * RJ45<br>1 * RS232 (DB9)<br>1 * Parallel (DB25)<br>1 * Line-Out<br>1 * Microphone-In<br>1 * PS/2<br>OTHERS<br>KVM Port x1<br>Power Backplane Port x1 | FRONT PANEL<br>2 * USB 3.0<br>1 * USB 2.0<br>1 * USB 2.0/eSATA Combo<br>1 * Line-out<br>1 * Microphone-in<br>REAR<br>2 * USB 3.0<br>2 * USB 2.0<br>2 * Display Port (1.1)<br>1 * VGA (15-Pin)<br>1 * RJ45<br>1 * Line-Out<br>1 * Microphone-In<br>OPTIONAL LEGACY I/O -<br>REAR PANEL*<br>1 * RS232 (DB9)<br>1 * PS/2<br>DISPLAY PORT LOOPBACK<br>2 * Display Port (1.1)<br>OTHERS<br>KVM Port x1<br>Power Backplane Port x1 |
| SECURITY/<br>MANAGEMENT | Support Intel vPro and AMT<br>Optional TPM 1.2<br>Optional Computrace BIOS | Support Intel vPro and AMT<br>Optional TPM 1.2<br>Optional Computrace BIOS | Support Intel vPro and AMT<br>Optional TPM 1.2<br>Optional Computrace BIOS |
| INDICATORS | 1 * HDD LED<br>1 * Power LED<br>Debug Signals | 1 * HDD LED<br>1 * Power LED<br>Debug Signals | 1 * HDD LED<br>1 * Power LED<br>Debug Signals |
| OTHERS | 2 * Onboard USB Header (4-Pin)<br>Ambient Thermal Sensor | 2 * Onboard USB Connector | 2 * Onboard USB Header (4-Pin)<br>Ambient Thermal Sensor |

TABLE 2

SOFTWARE SPECIFICATIONS

|  | SLIM COMPUTER MODULE | SMALL COMPUTER MODULE | LARGE COMPUTER MODULE |
| --- | --- | --- | --- |
| BIOS | Phoenix BIOS | Phoenix BIOS | Phoenix BIOS |
| OPERATING SYSTEM | Windows 7 - 32 Bit and 64 Bit Windows Vista - 32 Bit and 64 Bit Windows XP - Service Pack 3 Linux Kernels | Windows 7 - 32 Bit and 64 Bit Windows Vista - 32 Bit and 64 Bit Windows XP - Service Pack 3 Linux Kernels | Windows 7 - 32 Bit and 64 Bit Windows Vista - 32 Bit and 64 Bit Windows XP - Service Pack 3 Linux Kernels |

TABLE 3

POWER SPECIFICATIONS

|  | SLIM COMPUTER MODULE | SMALL COMPUTER MODULE | LARGE COMPUTER MODULE |
| --- | --- | --- | --- |
| INTERNAL POWER SUPPLY | 250 Watt Discrete Minimum 80 PLUS and UL Certified | 300 Watt Discrete Minimum 80 PLUS and UL Certified | 1350 Watt Shared Minimum 350 Watt Discrete Minimum 80 PLUS and UL Certified |
| BACKUP POWER SUPPLY | None | None | UPS Subsystem Interface (Base Module) |

TABLE 4

MECHANICAL SPECIFICATIONS

|  | SLIM COMPUTER MODULE | SMALL COMPUTER MODULE | LARGE COMPUTER MODULE |
| --- | --- | --- | --- |
| MOTHERBOARD | ~267 mm Width ~233 mm Length BTX Form Factor - 2 Slots | ~267 mm Width ~233 mm Length BTX Form Factor - 3 Slots | ~267 mm Width ~233 mm Length BTX Form Factor - 2 Slots |
| EXPANSION BAYS | EXTERNAL 1 * Slim Optical Disk Drive 2 * 2.5" or 1 * 3.5" INTERNAL 1 * 3.5" or 2 * 2.5" | EXTERNAL 1 * Slim Optical Disk Drive 2 * 2.5" | EXTERNAL 1 * 5.25" 2 * 2.5" or 1 * 3.5" INTERNAL 2 * 3.5" |
| EXPANSION SLOTS | ONBOARD 1 * Low-Profile PCIe Gen3 x16 1 * Low-Profile PCIe Gen3 x4 RISER CARD N/A | ONBOARD 2 * Low-Profile PCIe Gen3 x16 1 * Low-Profile PCIe Gen3 x4 RISER CARD PCIe x16 → PCIe x16 PCIe x16 → PCIe x8 + PCIe x8 PCIe x16 → PCI (Requires Bridge) | ONBOARD 1 * Full-Height PCIe Gen3 x16 1 * Full-Height PCIe Gen3 x4 RISER CARD PCIe x16 → PCIe x16 PCIe x16 → PCIe x8 + PCIe x8 PCIe x16 → PCI (Requires Bridge) |
| CHASSIS | ~290 mm Width ~320 mm Depth ~85 mm Height Tool-less | ~290 mm Width ~320 mm Depth ~100 mm Height Tool-less | ~290 mm Width ~320 mm Depth ~180 mm Height Tool-less |

TABLE 5

ENVIRONMENTAL AND REGULATORY SPECIFICATIONS

|  | SLIM COMPUTER MODULE | SMALL COMPUTER MODULE | LARGE COMPUTER MODULE |
| --- | --- | --- | --- |
| GREEN POLICY | EPEAT Gold Energy Star 5.2 RoHS 2012 Compliant | EPEAT Gold Energy Star 5.2 RoHS 2012 Compliant | EPEAT Gold Energy Star 5.2 RoHS 2012 Compliant |
| SOFTWARE | Microsoft WHQL | Microsoft WHQL | Microsoft WHQL |

Having provided the above exemplary technical specifications associated with the slim, small, and large computer module configurations, an exemplary architecture associated with the motherboard that may be used in the slim, small, and large configurations will now be described. However, as will be apparent, the technical specifications provided above and the architecture to be described in further detail herein may be modified in various ways to include additional and/or different components that provide substantially similar functionality (e.g., based on changing market trends, new technologies emerging, etc.). For example, in one implementation, the architecture associated with the motherboard shown in FIG. 7 may be based on the Intel Maho Bay desktop platform, the next major release in the Intel desktop architecture, currently scheduled to be available in early 2012. In particular, the Maho Bay desktop platform will have various optimizations to improve graphics and power performance, and may generally include a processor 705 (e.g., Ivy Bridge, Sandy Bridge, etc.), a chipset 710 having a platform controller hub (PCH) architecture (e.g., Panther Point), one or more Wi-Fi (or wireless networking) modules, and a physical-layer local area network (LAN) chip. Further, the motherboard may include clock circuitry 775 based on a CK505 clock synthesizer 775, wherein the clock synthesizer 775 may be programmed to generate all motherboard clock signals.

In one implementation, the processor 705 supported on the motherboard may include any suitable processor 705 in the Ivy Bridge, Sandy Bridge, or other similar product lines that have ninety-five watts or less in thermal design power (i.e., the maximum power that a cooling system 725 associated with the computer module can dissipate), which may reduce the heat that fans, heat pipes, and other thermal management components associated with the cooling system 725 need to exhaust from the stack, while only eliminating high-end desktop processors targeted to gaming and server markets. As such, the processor 705 may be chosen to meet these thermal design power requirements, whereby the processor 705 may be chosen from the Ivy Bridge product line, which generally includes two mainstream power levels (i.e., sixty-five watts and ninety-five watts). Further, current market trends indicate that certain mobile processors may be repackaged to suit desktop environments, in which case the processor 705 may be chosen from platforms that have thirty-five to forty-five watts in thermal design power. In one implementation, the processor 705 may raise the thermal design power to approximately one-hundred and fifty watts in the slim computer module configuration due to the smaller chassis, which may cause additional thermal challenges. Although the cooling system 725 and other thermal management components may permit the slim configuration to achieve higher thermal performance levels, a different processor 705 may be used in the slim configuration to reduce ambient noise levels. For example, the processor 705 may be chosen from a mobile platform (e.g., the high-end Sandy Bridge line), which may be smaller and quieter than desktop platforms having identical performance levels, though choosing the processor 705 from a mobile platform may cost approximately fifty percent more than an identically performing desktop platform.

In one implementation, the motherboard may further include have one Peripheral Component Interconnect Express (PCIe) x4 slot 730 and one PCIe x16 slot 730, wherein the PCIe x4 slot 730 may be used to add a network port 715 to another computer module (e.g., via a LAN controller 715, LAN docking switch 715, and RJ45 connector 715), while the PCIe x16 slot 730 may house a riser card. In particular, the adaptive computing system may support various riser cards having different configurations to meet varying computing needs, as will be described in further detail below. In one implementation, the motherboard may further support a Peripheral Component Interconnect (PCI) bus via an active riser solution, or the motherboard may alternatively connect an integrated PCI bus on the chipset 710 to the riser card to support the PCI bus. However, because routing the integrated PCI bus on the chipset 710 may increase a size associated with the motherboard with limited (if any) benefit, the active riser solution may be preferred. Further, although older operating systems may be limited in supporting PCIe to PCI bridge components, most operating systems typically support PCIe to PCI bridge components available from certain manufacturers (e.g., Ricoh). In any case, the motherboard may support the PCI bus on the riser card to house legacy fiber network cards and other legacy cards that connect to the PCI bus. In one implementation, the motherboard may further have a PCIe x4 backplane connector 735, which may be used to route display port, USB, Ethernet, audio, and control signals to and from the ECKVM backplane. However, the PCIe backplane connector 735 may simply have a PCIe x4 form-factor (i.e., the PCIe backplane connector 735 may not necessarily route PCIe signals to or from the ECKVM backplane).

In one implementation, the motherboard may further have one or more Low Pin Count (LPC) connectors or headers 790 to support add-on legacy ports via an LPC bus associated with the chipset 710 (e.g., PS/2 keyboards and mice, RS-232 (DB9) serial device, DB25 parallel ports, etc.). Moreover, in one implementation, the motherboard may optionally include a Trusted Platform Module (TPM) microcontroller 785 that connects to the LPC bus via the LPC headers 790, wherein a basic input/output system (BIOS) 745 that provides all management functions on the motherboard may support the TPM microcontroller 785. In one implementation, the BIOS 745 may be based on a current Phoenix BIOS revision to provide all management functions on the motherboard. For example, because Phoenix generally charges favorable fees to license tools that may be needed to modify DMI variables, boot screens, and other features associated with the BIOS 745, having the BIOS 745 based on current Phoenix BIOS revisions may lessen dependence on third-party engineers to make modifications to the BIOS 745. Further, a system management bus (SMBus) header 780 may be connected to the chipset 710 to provide additional functions to manage devices having an interface associated with the SMBus.

In one implementation, a link between the processor 705 and the chipset 710 may include a Direct Media Interface (DMI) and Flexible Display Interface (FDI) infrastructure, which may terminate on the chipset 710 (or platform controller hub 710). For example, the DMI infrastructure may provide primary communications between the processor 705 and the chipset 710, while the FDI infrastructure may provide an outbound interface from an integrated graphics controller on the chipset 710 to one or more display ports and RGB VGA connectors 750 that route video signals to display devices. Further, in one implementation, two random access memory (RAM) channels may be connected to four dual in-line memory module (DIMM) sockets 740 that support both 1066 and 1333 megahertz (MHz) double-data-rate three (DDR3) DIMMs and RAM configurations up to sixteen gigabytes. However, in one implementation, the motherboard may have less RAM capacity to reduce costs (e.g., typically four gigabytes), and furthermore, may have a 2× (rather than 4×) DIMM slot configuration 740 to maintain a small board size (although the 2× DIMM slot configuration 740 may cause larger RAM configurations to cost more because higher density memory modules will be needed). In one implementation, the motherboard may include a twenty-four pin ATX power connector 720 and one or more voltage regulators 720 to receive ATX power from the power backplane (or discrete power supply), wherein various general purpose input/output (GPIO) headers 770 may be attached to the chipset 710 to control various infrastructure control functions and simply cable connections between the motherboard, the front panel, slave controllers, or other components associated with the adaptive computing system (e.g., the GPIO headers 770 may include a power LED header to drive a power LED, a power on header to turn the motherboard on and off and connect to the remote control, a hard-drive LED header to display hard drive activities, an intruder header to detect chassis intrusions, etc.).

In one implementation, as noted above, the PCIe x16 slot 730 may house a riser card that provides an interface between the motherboard and industry standard PCIe adapters, wherein the riser card have various different configurations to meet varying computing needs. For example, although the integrated graphics controller on the chipset 710 may perform sufficiently well to lessen or eliminate needs to have lower-end video adapters, gamers and other users may favor a discrete high-performance video graphics card over the integrated graphics controller on the chipset 710. Accordingly, to provide greater flexibility in the design associated with the adaptive computing system, the riser card may housed in the PCIe x16 slot 730 to permit users to connect PCIe devices to the motherboard and have more options to choose expansion cards that allow the stack to fit into different environments or meet different computing needs. For example, in one implementation, the various configurations associated with the riser card may vary among the slim, small, and large computer module configurations to meet anticipated needs that different user communities may have, as shown below:

TABLE 6

RISER CARD CONFIGURATIONS

| RISER CARD CONFIGURATION | SLIM | SMALL | LARGE |
|---|---|---|---|
| PCIe x16 → PCIe x16<br>Full-Height and Full-Length* I/O Adapters | X | X | X |
| PCIe x16 → PCI<br>Full-Height and Full-Length* I/O Adapters | X | X | X |
| PCIe x16 → PCIe x8 + PCIe x8<br>Full-Height and Full-Length* I/O Adapters |  | X | X |
| PCIe x16 → PCIe x8 + PCI<br>Full-Height and Full-Length* I/O Adapters |  | X | X |
| PCIe x16 → PCIe x16<br>Double-Width and Full-Length* I/O Adapters |  | X | X |
| PCIe x16 → PCIe x16 + PCI<br>Full-Height and Full-Length* I/O Adapters |  | X | X |

*The slim and small computer modules may not necessarily support full-length and full-height I/O adapters due to physical space limitations.

In one implementation, where the chipset 710 has the Panther Point PCH architecture, the chipset 710 may enable the motherboard to support various input/output connectors typically present on a computer module rear panel. For example, in one implementation, the various input/output connectors supported on the motherboard and provided on a rear panel associated with the slim, small, and large computer module configurations may include, at a minimum, the following input/output interfaces:

Two (2) display ports 750,
One (1) VGA port 750,
Two (2) USB 2.0 ports 755,
Two (2) USB 3.0 ports (in FIG. 7, between RGB VGA connector 750 and RJ45 connector 715),
One (1) eSATA (external Serial Advanced Technology Attachment) interface 760,
One (1) one-gigabit (1 Gb) Ethernet interface 715,
One (1) removable* stereo audio out jack 765, and
One (1) removable* microphone audio in jack 765.
* Removable during surface-mount technology process to assemble the motherboard.

Further, in one implementation, the motherboard may provide additional input/output interfaces on a front panel to connect external storage and USB devices (e.g., CAC readers, thumb drives, etc.), wherein the particular input/output interfaces may be chosen to address customer requests relating to custom input/output interfaces. For example, the United States Nuclear Regulatory Commission generally requires removing all audio and USB ports, wherein the interfaces on the rear and/or front panel may be customized per certain customer requests. As such, in one implementation, the adaptive computing system may include a mezzanine (or intermediate) board lacking certain input/output interfaces, which may or may not be added to the final shipped motherboard. Alternatively (or additionally), the motherboard may be re-spun with different input/output interfaces, or certain connectors may simply be removed from the motherboard (i.e., the motherboard may still include the input/output circuitry but lack the connectors or interfaces needed to attach peripheral devices to the circuitry). Accordingly, in one implementation, the motherboard may have a design that can take future customization requests or requirements into consideration, wherein the design may isolate a section on the board associated with the input/output interfaces to enable making future customizations, reduce the time needed to re-spin and test new motherboard versions (i.e., because any changes will be localized), and provide customers with greater flexibility to have a computing solution that meets their unique needs.

In one implementation, the two display ports 750 may include DisplayPort version 1.1 connectors, the currently adopted Video Electronics Standards Association (VESA) standard (available at the VESA website, www.vesa.org), which may be supported in the Ivy Bridge platform associated with the processor 705. However, because VESA approved DisplayPort version 1.2 in December 2009, the motherboard and other components associated with the video infrastructure in the adaptive computing system may have a design ready to support DisplayPort version 1.2 if and/or when DisplayPort version 1.2 becomes the new video standard. As such, in one implementation, certain input/output interfaces and boards on the motherboard and other video infrastructure components (e.g., in the ECKVM switch) may be redesigned to support the DisplayPort version 1.2 standard without having to substantially overhaul the overall adaptive computing system design (e.g., the power and ECKVM backplane infrastructures may need no changes to support the new standard). Further, the motherboard may include a display port switch to enable looping signals from the display ports 750 on the rear panel to the ECKVM backplane via a PCIe x1 right angle connector 730 that connects the motherboard to a display port daughter card on the ECKVM backplane.

In one implementation, the slim, small, and large computer module configurations may house one or more hard disk drives, solid state drives, optical drives, and other storage devices, wherein how many storage devices are housed in a particular computer module may depend on the size associated therewith. For example, the computing industry has been rapidly adopting a 2.5" form-factor as the standard associated with hard disks and solid state drives (i.e., solid state drives are currently only available in the 2.5" form-factor, and hard disk drives will likely make the same migration in the near future). Therefore, in one implementation, the adaptive computing system may generally support disk drives and other storage devices having the 2.5" form-factor, wherein the slim, small, and large computer modules may have drive bays with the Floppy Diskette Drive Bay (FDD) form-factor to house storage devices with the 2.5" form-factor. For example, in one implementation, the slim and small computer modules may have two drive bays with the FDD form-factor, while the large computer module may have four factor drive bays with the FDD form-factor. In one implementation, each drive bay with the FDD form-factor size may house two 2.5" drives with an adapter bracket, which may further allow the computer modules to use various removable hard disk drive storage enclosures currently available in the market, which may provide users with further flexibility. Further, in one implementation, the computer modules may optionally support slim form-factor DVD-RW or Blu-ray drives, wherein Blu-ray operations may be supported with High-Bandwidth Digital Content Protection (HDCP) and Audio Content Protection (ACP) (e.g., the ECKVM switch may support HDCP and ACP, or in standalone computer modules that are not connected to the ECKVM switch, the motherboard may have integrated circuitry to support HDCP and ACP).

In one implementation, the adaptive computing system may include various design features that may address compliance in security, regulatory, performance, environmental, safety, and other contexts, and moreover, may have various certifications in these contexts. For example, in one implementation, the adaptive computing system may enable deploying one or more computer modules remotely from the stack associated therewith, which may address legacy security policies that require physically locating computers having certain classifications a minimum distance away from other computers (e.g., to prevent radio frequencies emitted from one machine infiltrating and interfering with sensitive data on the other machine), and in a related context, may be designed to prevent radiating radio frequency energy that may interfere with other receivers located within a certain distance in order to achieve Federal Communications Commission (FCC) Class B certification (e.g., as described in "Understanding the FCC Regulations for Computers and Other Digital Devices," the contents of which are hereby incorporated by reference in their entirety). In addition, the design may include mechanical and electrical lockouts and other safety features to achieve a UL safety listing, the power supplies used in the adaptive computing system may have an efficiency to receive 80 PLUS® certification, and may be designed to meet efficiency and other environmental performance criteria sufficient to receive EPEAT® Gold and Energy Star® 5.2 certifications, the latter described in "Energy Star® Program Requirements for Computers," the contents of which are hereby incorporated by reference in their entirety. Moreover, the efficiency and other environmental performance design may be certified to comply with the European Union Restriction of Hazardous Substances (RoHS) directive, described in European Parliament "Directive 2002/95/EC" on restricting certain hazardous substances from being used in electrical and electronic equipment, the contents of which are hereby incorporated by reference in their entirety. Additionally, the computer modules that can be deployed in the adaptive computing system may be designed to operate with thirty-two bit and sixty-four bit Windows 7 versions, thirty-two bit and sixty-four bit Windows Vista versions, Windows XP Service Pack 3, and various current or future-developed Linux kernels, and to that end, may be pre-loaded with drivers to support the aforementioned operating systems. Further, the computer modules may be tested under the Microsoft Windows Hardware Quality Labs (WHQL) program to receive a Microsoft Windows 7 WHQL certification, described in "WHQL Testing," the contents of which are hereby incorporated by reference in their entirety.

Figure 8:
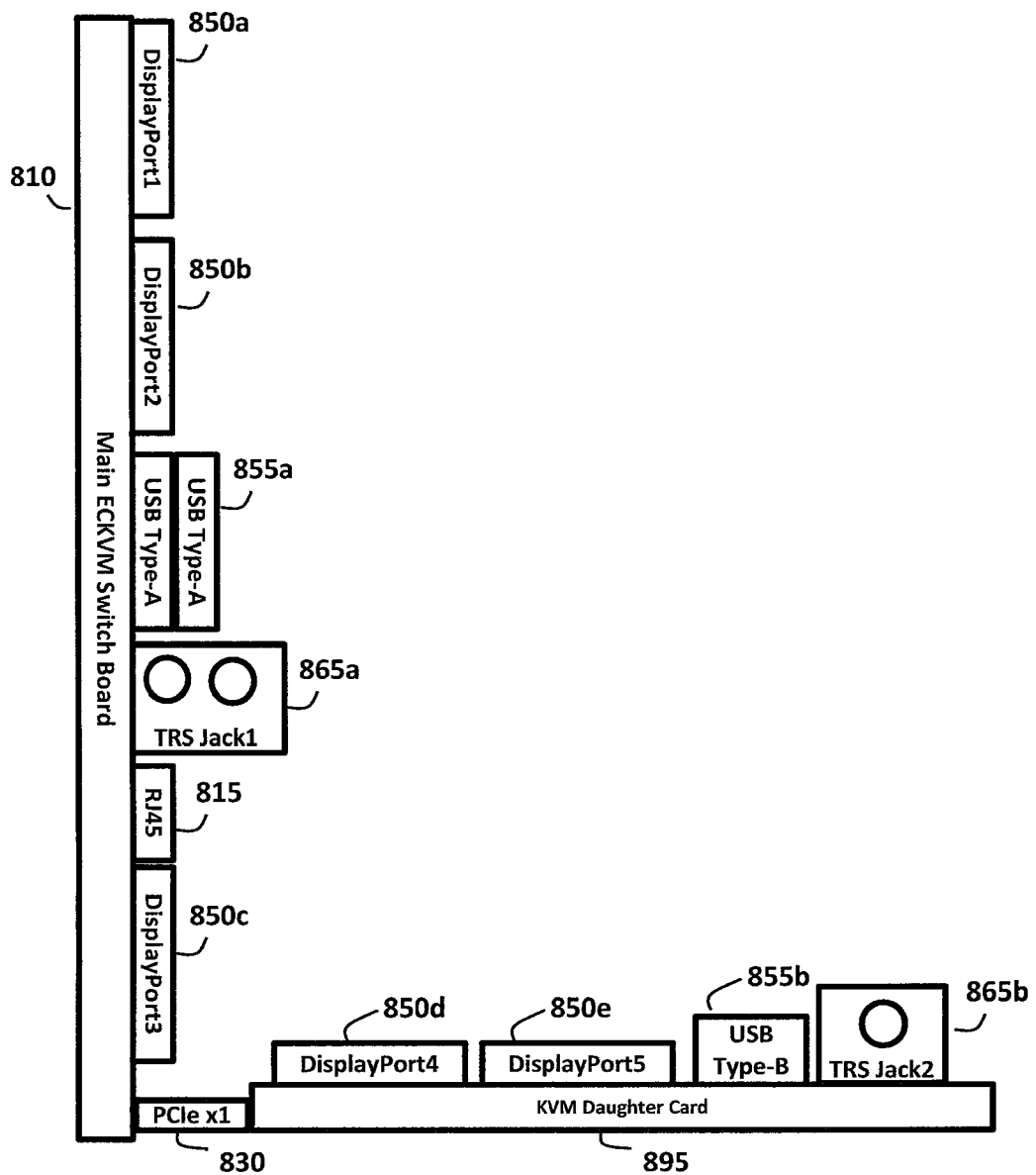
Figure 9:
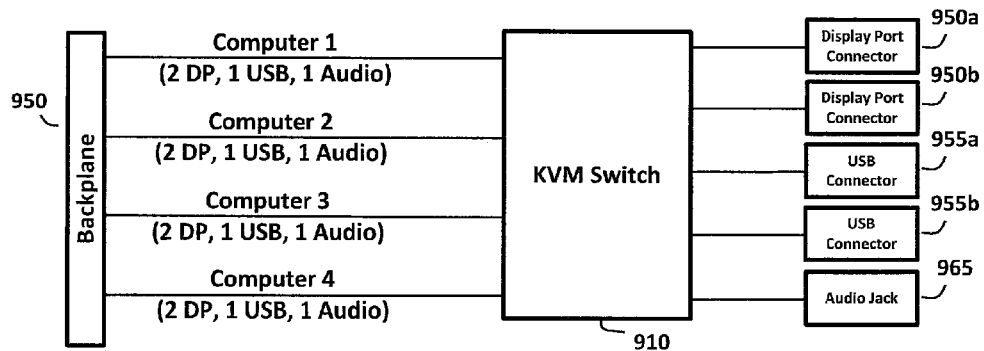
FIG. 9 illustrates an exemplary block diagram associated with certain switching circuitry that may be used in the modular switching architecture, according to one aspect of the invention.

According to one aspect of the invention, FIG. 8 illustrates an exemplary form-factor associated with the ECKVM switch that may be used in the adaptive computing system described herein, while FIG. 9 illustrates an exemplary block diagram associated with certain switching circuitry that may be used in the modular switching architecture. In particular, as noted above, the ECKVM switch may generally include one printed circuit board that integrates independent Ethernet switching circuitry, KVM switching circuitry, and the master controller shown in FIG. 4, wherein the ECKVM switch may be installed in the base module associated with the adaptive computing system to enable users to connect and switch among multiple computer modules deployed in the stack and/or a remote computer module deployed separately from the stack. In one implementation, as noted above, the adaptive computing system may include independent or standalone one computer module, in which case the stack may not necessarily have the ECKVM backplane that can connect multiple computer modules to the ECKVM switch. However, in one implementation, users may have an option to purchase the ECKVM backplane with a standalone computer module to make the computer module ready to be upgraded to a multiple computer module solution that can utilize the switching functionality associated with the ECKVM switch and backplane. In another alternative, if the ECKVM backplane has a low cost, the ECKVM backplane may be included in every computer module shipped to customers, including standalone computer modules, in order to make every shipped computer module ready for an ECKVM switching upgrade.

For example, in one implementation, the ECKVM switch form-factor shown in FIG. 8 may include a main ECKVM switch board 810 with two display ports 850*a-b* to connect two digital displays, two or more USB ports 855*a* to connect a keyboard-mouse and/or other USB devices, a tip-ring-sleeve (TRS) jack 865*a* to connect an audio input device (e.g., a microphone) and an audio output device (e.g., speakers or headphones), and an RJ45 jack 815 to connect Ethernet or other network signals to the entire stack and the remote computer module. Further, the ECKVM switch form-factor may include a KVM daughter card 895 connected to the main ECKVM switch board 810 via a PCIe x1 connector 830. In one implementation, the KVM daughter card 895 may include two display ports 850*d-e*, which may be looped to display ports 850*a-b*, to connect the digital displays to the remote computer module, a USB port 855*b* to transport Ethernet and KVM signals to and from the remote computer module, and a TRS jack 865*b* to transport control signals to and from the remote computer module. Moreover, in one implementation, the main ECKVM switch board 810 may include an additional display port 850*c* to connect with a remote control, wherein the master controller may be used to control the entire stack and the remote computer module via the remote control, as will be described in further detail below. Furthermore, in scenarios where a user installs a discrete graphics card within a particular module, an output from the discrete graphics card may be connected to the ECKVM switch (e.g., via integrated display port circuitry on the motherboard, which may alternatively route graphics output to the ECKVM switch from the discrete graphics card or an integrated graphics controller on the chipset).

In one implementation, the ECKVM form-factor and associated circuitry may have components designed to receive security certifications, which may be particularly important to governmental customers that handle information with classified status. For example, to meet National Information Assurance Partnership (NIAP) certification requirements, the ECKVM switch may be entirely concealed within a metal enclosure and security tape may be used to protect the switch. As a result, all jumpers and connectors associated with the ECKVM switch will be accessible from outside the enclosure, whereby users need not open the enclosure to access the jumpers and connectors needed to connect components associated with the ECKVM backplane, the power backplane, and input/output devices to the ECKVM switch. Furthermore, in one implementation, the ECKVM switch may be installed vertically within the base module to dock directly into the ECKVM backplane, and as noted above, may have independent Ethernet switching circuitry, control switching circuitry (e.g., via the master controller), and KVM switching circuitry. In one implementation, the Ethernet switching circuitry may generally perform in substantially a similar manner to standard standalone Ethernet switches, providing a 1 Gb port from each computer module to a 1 Gb uplink port that can be connected to a primary Ethernet connection, while the control and KVM switching circuitry may have a substantially similar design, as will be described in further detail herein.

For example, according to one implementation, FIG. 9 illustrates an exemplary block diagram associated with the KVM switching circuitry design, while substantially similar circuitry may be implemented on the master controller to provide the control switching functionality. In particular, the ECKVM switch may include an independent KVM switch 910 integrated onto the printed circuit board associated therewith, wherein the KVM switch 910 may include separate ports associated with various computer modules deployed in the stack and/or the remote computer module deployed separately from the stack (e.g., Computers 1-4). As such, the KVM switch 910 may generally provide a many-to-one switch, which may switch between "many" computer modules and "one" input/output device set (e.g., a keyboard, mouse, monitors, and audio devices). For example, in the diagram shown in FIG. 9, which includes four computer modules, the KVM switch 910 would provide a four-to-one switch between four computer modules and one input/output device set shared among the four computer modules. In one implementation, the KVM switch 910 may generally receive and transmit signals to any computer modules deployed in the stack with the base module via a connector to the ECKVM backplane 950, and may receive transmit signals to the remote computer module (if present) via connectors on the ECKVM daughter card shown in FIG. 8.

In one implementation, as noted above, the KVM switch 910 may be designed to control switching among the various computer modules via buttons situated on the remote control that are associated with the respective computer modules. As such, the KVM switch 910 may be designed to prevent switching until all buttons pressed on the remote control have been released (i.e., the KVM switch 910 does not switch while any buttons are being held down), prioritize a first button that was pressed if multiple buttons are pressed, ignore any subsequent button presses while one or more buttons are being held down, and activate a first enumerated port in response to initially powering up. In one implementation, the remote control may have a microcontroller that interfaces with the buttons associated with the computer modules and handles the above behaviors that relate to waiting until all pressed buttons have been released before switching, prioritizing a first button press, ignoring subsequent button presses, and activating the first enumerated port, as will be described in further detail below. Further, as shown in FIG. 9, the KVM switch 910 may receive input signals from the computer modules on the stack and/or the remote computer module via the connection to the ECKVM backplane 950, wherein the input signals may include two display port input signals, one USB input signal, and one audio input signals, while the remote computer module (if present) connects to the ECKVM backplane 950 (and consequently the KVM switch 910) via two display port cables and one USB cable on the ECKVM daughter card. In one implementation, the KVM switch 910 may route output signals to the computer modules on the stack and/or the remote computer module via two display ports 950*a-b*, various USB connectors 955*a-b*, and one audio jack 965 (microphone and headphones/speakers). In one implementation, the first USB connector 955*a* may have two ports connected to a keyboard and mouse, while the second USB connector 955*b* may have two ports connected to the remote control (e.g., to connect a USB thumb drive, CAC reader, etc.).

Figure 10:
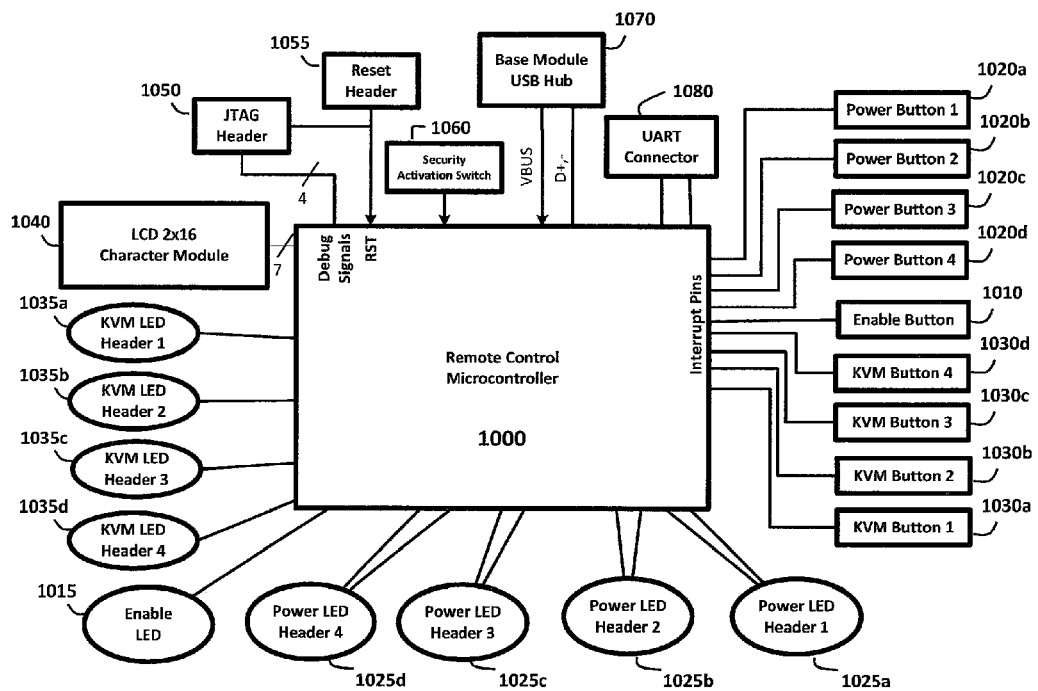
FIG. 10 illustrates an exemplary block diagram associated with a hardware remote control that may be used in the adaptive computing system described herein, according to one aspect of the invention.

According to one aspect of the invention, FIG. 10 illustrates an exemplary block diagram associated with the hardware remote control noted above, which may operate the adaptive computing system via a command path to a master controller in the base module and associated with the ECKVM switch. In particular, the remote control may have a microcontroller 1000 that interfaces with various KVM buttons 1030 associated with various computer modules deployed in the stack and/or the remote computer module, wherein users may press the KVM buttons 1030 to toggle, switch, or otherwise activate a particular computer module. Additionally, as noted above, the microcontroller 1000 may handle various behaviors that relate to waiting until all pressed KVM buttons 1030 have been released before sending a KVM switching signal to the ECKVM switch, prioritizing a first one of the KVM buttons 1030 that was pressed if multiple KVM buttons 1030 are pressed, ignoring subsequent presses on the KVM buttons 1030 once one of the KVM buttons 1030 has been pressed, and activating the computer module on a port associated with a first KVM button 1030*a* on initial startup.

In one implementation, the remote control may have one or more USB ports 1070 to connect with a USB hub on the base module, wherein the microcontroller 1000 may have a dedicated bus-powered controller to provide access to USB devices on the remote control. As such, because the remote control may be easily accessible to users, the USB ports 1050 may support simultaneously connecting a thumb drive, external common access card (CAC) reader, or any other suitable USB device to the remote control, and the USB ports 1070 may further be removable to support classified environments or deployment contexts having security profiles that restrict USB usage. Further, one or more USB cables may connect the base module to the remote control and various power management buttons 1020 associated therewith, while a separate display port cable may connect the remote control to the KVM switch associated with the base module to address security risks. Alternatively, in one implementation, the display port cable connecting the remote control to the ECKVM switch on the base module may have sufficient wires or other bandwidth to support the USB ports 1070 on the remote control. In one implementation, connectors on the base module and the remote control that mate with the USB cables may be clearly labeled to indicate that connectors are not remote control (rather than USB) ports, and a connector associated with the display port cable may be similarly labeled. Alternatively, in one implementation, signaling between the master controller and the remote control 120 may be handled using Inter-Integrated Circuit (I²C) rather than USB (i.e., although USB may have substantial flexibility, USB may require activating more protocols prior to operation, whereby I²C may enable the remote control to become operational, process user inputs, and present user feedback faster than USB).

Furthermore, the remote control may simplify operating the adaptive computing system, clearly present status information to users, electronically distinguish power and KVM control functions to achieve NIAP security certification, and isolate and modularize KVM control functions to add or remove KVM control functions to the remote control. For example, in one implementation, the remote control may generally include a liquid crystal display 1040 to present status information to users and generally simplify operating the adaptive computing system via the remote control (e.g., displaying on-screen menus to configure power saving modes, define power-on priorities, etc.). Additionally, the remote control may include various power buttons 1020 to turn individual computer modules on and off, various KVM control buttons 1030 to toggle, activate, or otherwise switch among the various individual computer modules, and an enable (or master power) button 1010 to turn the entire stack on and off (i.e., the base module and any individual computer modules or remote computer modules). In one implementation, the remote control may further include a JTAG header 1050 and a reset header 1055, which may be used to connect with an external debug emulator using a JTAG cable (e.g., to modify firmware that controls the remote control and/or the master controller, which may otherwise be locked down to prevent flashing or modifying the firmware except via the JTAG header 1050 and the reset header 1055). In one implementation, the remote control may further have a universal asynchronous receiver/transmitter (UART), which may be used to connect a USB-to-UART cable between the remote control and a motherboard to test and automate firmware flashing during production. In particular, the motherboard may generally be used in a computer module that will accompany a base module during a test session, which may generally include a network server sending test instructions to an application running on the motherboard, which then relays the test instructions to the remote control to simulate user inputs that control the microcontroller 1000 in the remote control, thereby testing whether the remote control functions properly and whether the instructions are properly routed from the master controller to the remote control.

Further, in one implementation, the remote control may have a mechanical security activation switch 1060, which may initially be closed to connect a security activation pin on the microcontroller 1000 to ground. In the closed state, the remote control may be considered unsecure (i.e., to communicate with other unsecured master controllers), wherein users can remove a latch associated with the security activation switch 1060 to activate security features associated with the microcontroller 1000. For example, in response to the user removing the latch to open the security activation switch 1060 and connecting the remote control to an unsecured master controller, various security features may be activated on the remote control and the master controller (e.g., encoding communications between the remote control and the master controller via randomly generated keys to prevent the remote control from working with other master controllers and vice versa, locking down the firmware on the remote control and the master controller except via an interface associated with the JTAG header 1050 and the reset header 1055, and disabling an interface associated with the UART connector 1080). Further, in response to the user removing the latch to open the security activation switch 1060, subsequent changes to the security activation switch 1060 may no longer affect the security features on the remote control (i.e., the security activation switch 1060 provides a one-time activation option to secure operating the remote control with a particular master controller).

In one implementation, users may press and release the enable button 1010 to turn on the base module, press and hold the enable button 1010 after the base module has turned on and reached an operational state to turn on all computer modules on the stack (and the remote computer module if present), and press and hold the enable button 1010 again to turn off the base modules and any other computer modules currently powered on (i.e., essentially a forced shutdown). In one implementation, the power buttons 1020 may control powering on and off individual computer modules associated therewith, wherein a first power button 1020*a* may be associated with a computer module situated immediately above the base module on the stack, a second power button 1020*b* may be associated with a next highest computer module, and so on, while a fourth power button 1020*d* may be associated with the remote computer module, regardless of how many computer modules may be in the stack. In one implementation, once the user has turned on the base module (via the enable button 1010), pressing and holding power buttons 1020 may then turn on associated computer modules, while pressing and holding the power buttons 1020 again may turn off the associated computer module in a substantially similar manner to holding the power button on a typical desktop computer. However, because pressing and holding the power button 1020 to turn off an associated computer module essentially provides a forced shutdown, which should only be done in extraordinary circumstances, the user should make every effort to rely on an operating system running on the computer module to handle shutting the computer module down. For example, as noted above, the adaptive computing system may include multiple methods to trigger shutdown procedures, which users should attempt before using the enable button 1010 or the power buttons 1020 to trigger forced shutdowns (e.g., sending operating system instructions to embedded motherboard controllers, using a GPIO power button, sending instructions from the SMBus to the chipset or the embedded motherboard controller, using the master controller shutdown procedure, etc.).

In one implementation, as noted above, the remote control may include KVM control buttons 1030 to toggle or otherwise switch the KVM circuitry on the ECKVM switch among the individual computer modules, wherein the KVM control buttons 1030 may be associated with the individual computer modules in a substantially similar manner to the power buttons 1020. In particular, pressing a KVM button 1030 associated with a particular computer module may switch the KVM to cause the console displays, keyboard, mouse, and audio to the associated computer module, and to address security concerns, the KVM buttons 1030 may be similarly isolated within a compartment that plugs into a housing associated with the remote control. As such, in one implementation, isolating the KVM buttons 1030 may provide a dedicated connection between the KVM buttons 1030 and the KVM switching circuitry on the ECKVM switch. Furthermore, to prevent accidental pressing, the KVM buttons 1030 may be spaced sufficiently apart to ensure that pressing one KVM button 1030 does not cause another KVM button 1030 to be inadvertently pressed, and the microcontroller 1000 may be configured to only switch to among computer modules in response to the associated KVM button 1030 being pressed and released (i.e., no switching will occur while the KVM button 1030 remains held down) and further to resolve conflicts in response to determining that more than one KVM button 1030 has been pressed at substantially the same time.

In one implementation, to handle powering on the base module and/or the individual computer modules, the microcontroller 1000 in the remote control may send a power on or power off command to the master controller, which may then instruct power management components to turn the base module and/or an individual computer module on or off. As such, the master controller may then communicate with the microcontroller 1000 to indicate a status associated with processing the power on or off command, which may drive various status indicators on the remote control, as will be described in further detail below. Similarly, to handle switching the KVM among the individual computer modules, the microcontroller 1000 may send a KVM switching command to the master controller, which may communicate the KVM switching command to the ECKVM switch via various GPIO pins. As such, the KVM switching circuitry may send a confirmation to the master controller in response to the KVM successfully switching the KVM to the corresponding computer module, wherein the master controller may then verify that the KVM was properly switched and acknowledge to the remote control that the KVM switching signal was appropriately processed. The microcontroller 1000 in the remote control may then further verify that the KVM was properly switched, which may drive various status indicators on the remote control, as described in further detail below.

In particular, the remote control may indicate a power status associated with the various computer modules via a power light emitting diode (LED) 1025 closely situated near the associated power buttons 1020. For example, any particular power LED 1025 may be off to indicate that the associated computer module has not been powered on, while powering on the associated computer module may cause the associated power LED 1025 to turn on. Moreover, in one implementation, in response to pressing and holding the power button 1020 associated with any particular computer module, thereby initiating a startup sequence on the associated computer module, the associated power LED 1025 may flash during the startup sequence (e.g., flashing green), and change to solid once the associated computer module has started running (e.g., solid green). In one implementation, an embedded controller on the motherboard associated with the computer modules may further detect any major state changes in an operating system running on the computer modules, wherein the state changes may be indicated on the associated power LED 1025 (e.g., in a similar manner to a power LED on a traditional desktop or notebook computer). Further, if the user chooses to turn all computer modules on substantially simultaneously (e.g., pressing and holding the enable button 1010), power LEDs 1025 associated with all computer modules present on the stack may operate in the same manner discussed above, although the power LEDs 1025 may flash during the startup sequences and change to solid in a power-on sequence order that the user previously defined and entered into the master controller (e.g., as described in further detail above with reference to FIG. 4).

Furthermore, in one implementation, the base module may indicate an overall system status with an enable LED 1015 on the remote control. For example, in one implementation, the enable LED 1015 may be off to indicate that a common power supply in the base module has not been turned on, solid red to indicate that the common power supply has been turned on but that no computer modules have been powered on, blinking red to indicate that a fault has occurred in the master controller, and solid green to indicate that the common power supply has been turned on and that one or more computer modules are drawing power from the common power supply. Similarly, the KVM buttons 1030 that can be used to switch the KVM among the various computer modules via the remote control may have associated KVM LEDs 1035 to indicate a current status associated with the ECKVM switch. More particularly, in response to the user pressing a particular KVM button 1030 to switch the KVM to the computer module associated with the particular KVM button 1030, the associated KVM LED 1035 may turn on, changing to a certain color (e.g., amber) to indicate that the KVM has been successfully switched to the associated computer module, while all other KVM LEDs 1035 may turn off. In one implementation, although the foregoing description relating to the enable LED 1015, the power LEDs 1025, and the KVM LEDs 1035 refer to certain particular colors, various other colors may be suitably used to reflect the various status indicators, as will be apparent.

In one implementation, because the remote control may always be visible to users, the remote control may have a design that reflects user needs. For example, to indicate overall quality in the adaptive computing system, the various buttons 1010, 1020, and 1030 on the remote control may have sizes based on a person having larger fingers, while having tactile qualities that a person with smaller hands or fingers would be able to feel. Further, all legends or other alphanumeric indicators printed on the remote control may be resistant to fading or removal, while the various LEDs 1015, 1025, and 1035 may use white, red, green, blue, and other colors that can be easily perceived visually. Further, the LEDs 1015, 1025, and 1035 may support dimmed or brightened colors to reflect particular needs in certain customer environments, wherein the master controller may enable users to select a dimness or brightness level associated therewith (e.g., visually impaired users may desire brighter colors that are easier to see, while environments having substantial natural light may support dimmer colors that provide greater contrast in bright light). Additionally, in one implementation, the enable button 1010, the power buttons 1020, and the KVM buttons 1030 may have different paint colors or finishes to match any colors on the associated computer module front panels (e.g., if a first computer module has a red front panel, the power button 1020a and the KVM button 1030a associated with the first computer module may also have a red color, while the enable button 1010 may have a color that matches a front panel on the base module, etc.). Moreover, as noted above, the stack can have various different power supply configurations, including common only, discrete and auxiliary, and common and discrete conterminously. As such, in one implementation, the remote control may be designed to support users operating the enable button 1010 and the power buttons 1020 consistently across all power supply configurations to avoid unnecessary confusion.

Accordingly, having described the adaptive computing system and the modular control, switching, and power supply architecture associated therewith, various mechanical, electrical, and functional features that provide a stable, safe, high performance, and easily assembled and serviced multiple desktop solution will be apparent. Moreover, additional implementation details relating to the adaptive computing system and the modular control, switching, and power supply architecture associated therewith may be provided in the documents entitled "Hampton Way System Specification," "Hampton Way Backplane Specification," "Hampton Way Ethernet, Control and KVM (ECKVM) Switch Specification, " "Hampton Way Motherboard Specification (Silver Board)," and "Hampton Way Remote Control Hardware Specification, " the contents of which are hereby incorporated by reference in their entirety. As such, although certain aspects and implementations may be described in the above disclosure to include particular features, structures, or characteristics, these documents may provide additional or alternate features, structures, or characteristics that may be used in connection with or separately from the described aspects and implementations, as will be apparent.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:
1. An adaptive computing system having a modular control, switching, and power supply architecture, comprising:
  a base module having a common power supply and a switch connected to a common input/output device set, wherein the common input/output device set includes a keyboard device, one or more video devices, and a mouse device;

multiple computer modules that mechanically interconnect with the base module via one or more mechanical alignment and securing mechanisms to form a vertical stack with the base module, wherein the base module and the multiple computer modules have identical widths and identical depths;

a backplane architecture that electrically interconnects the multiple computer modules and the base module in the vertical stack, wherein the backplane architecture includes:
- a power supply backplane configured to share the common power supply among the base module and the multiple computer modules; and
- a switching backplane configured to transport input/output signals associated with the common input/output device set between the multiple computer modules and the switch in the base module.

2. The system recited in claim 1, wherein the one or more mechanical alignment and securing mechanisms include mechanical lockouts to prevent installing the backplane architecture that electrically interconnects the vertical stack if the multiple computer modules and the base module are not correctly mechanically interconnected.

3. The system recited in claim 1, wherein the power supply backplane and the switching backplane include circuit boards that mate with connectors on opposite sides associated with the base module and the multiple computer modules to mechanically secure the multiple computer modules and the base module in the vertical stack.

4. The system recited in claim 3, further comprising:
one or more housings that enclose the base module and the multiple computer modules in the vertical stack, wherein the backplane architecture includes circuitry to generate one or more safety signals indicating whether the circuit boards and the connectors are correctly mated and whether the one or more housings are correctly closed; and
a master controller located in the base module and configured to:
receive the one or more safety signals from the circuitry associated with the backplane architecture;
prevent the power supply backplane from sharing the common power supply among the multiple computer modules if the one or more safety signals indicate that the circuit boards and the connectors are not correctly mated or the one or more housings are not correctly closed; and
control the power supply backplane sharing the common power supply among the multiple computer modules based on a capacity associated with the common power supply and power requirements associated with the base module and the multiple computer modules.

5. The system recited in claim 1, further comprising:
a chassis having one or more housings that enclose the base module and the multiple computer modules in the vertical stack;
one or more heat pipes arranged to channel thermal mass within the vertical stack to a radiator arranged in a predetermined location within the chassis; and
one or more fans arranged to direct airflow over the radiator towards an area in the chassis that has one or more openings to exhaust the thermal mass from the vertical stack.

6. The system recited in claim 1, wherein the multiple computer modules have identical motherboards with input/output circuitry located in an isolated region thereof.

7. The system recited in claim 1, further comprising a hardware remote control connected to the switch in the base module, wherein the hardware remote control includes:
an enable button to control supplying power to the base module and all the multiple computer modules in the vertical stack once power has been supplied to the base module;
multiple power buttons respectively associated with the multiple computer modules to individually control supplying the power to the multiple computer modules once power has been supplied to the base module;
multiple input/output switching buttons respectively associated with the multiple computer modules to associate the common input/output device set with the associated computer module; and
a microcontroller to communicate with a master controller located in the base module to control supplying the power in response to detecting one or more predetermined press sequences associated with the enable button or the multiple power buttons to communicate with the switch in the base module in response to detecting one or more presses associated with the multiple input/output switching buttons.

8. The system recited in claim 7, wherein the multiple computer modules have different front panel colors that match colors on the power buttons and the input/output switching buttons respectively associated with the multiple computer modules.

9. The system recited in claim 7, wherein the master controller powers the base module and all the multiple computer modules on or off in a predetermined order in response to the one or more predetermined press sequences associated with the enable button including a command to power on or off the base module and all the multiple computer modules.

10. The system recited in claim 1, further comprising a remote computer module connected to the switch in the base module, wherein the switching backplane further transports the input/output signals associated with the common input/output device set between the remote computer module and the switch in the base module.

11. The system recited in claim 10, wherein one or more of the multiple computer modules has a discrete power supply and does not share the common power supply in the base module via the power backplane.

12. The system recited in claim 1, wherein the switching backplane further transports infrastructure control signals and network signals the multiple computer modules and the switch in the base module.

13. The system recited in claim 1, wherein mechanical and electrical components associated with the modular control, switching, and power supply architecture have criteria that meets or exceeds criteria defined in one or more performance, efficiency, environmental, regulatory, or safety standards.

14. An adaptive computing system having a modular control, switching, and power supply architecture, comprising:
a base module having a power supply;
a computer module that mechanically interconnects with the base module via one or more mechanical alignment and securing mechanisms, wherein the one or more mechanical alignment and securing mechanisms include mechanical lockouts to prevent electrically interconnecting the base module and the computer module if the computer module and the base module are not correctly mechanically interconnected; and a backplane architecture that mechanically and electrically interconnects the computer module and the base module, wherein the backplane architecture includes circuit boards to mate with connectors on opposite sides associated with the base module and the computer module to mechanically secure the computer module to the base module.

15. The system recited in claim 14, wherein the computer module has a discrete power supply separate from the power supply in the base module.

16. The system recited in claim 14, wherein the backplane architecture includes a power supply backplane to share the power supply in the base module with the computer module.

17. The system recited in claim 16, further comprising:
one or more housings that enclose the base module and the computer module, wherein the backplane architecture includes circuitry to generate one or more safety signals indicating whether the circuit boards and the connectors are correctly mated and whether the one or more housings are correctly closed; and
a master controller located in the base module and configured to:
receive the one or more safety signals from the circuitry associated with the backplane architecture;
prevent powering on the base module or the computer module if the one or more safety signals indicate that the circuit boards and the connectors are not correctly mated or the one or more housings are not correctly closed; and
control the power supply backplane sharing the power supply in the base module with the computer module based on a capacity associated with the power supply and power requirements associated with the computer module.

18. The system recited in claim 14, further comprising:
a chassis having one or more housings that enclose the base module and the computer module; and
a cooling system having one or more heat pipes to channel thermal mass within the one or more housings to a predetermined location within the chassis and one or more fans to direct airflow over the predetermined location and exhaust the thermal mass from the chassis.

19. The system recited in claim 14, wherein the backplane architecture further transports network signals, infrastructure control signals, and one or more input/output device signals between the computer module and a switch in the base module.

20. The system recited in claim 14, wherein mechanical and electrical components associated with the modular control, switching, and power supply architecture have criteria that meets or exceeds criteria defined in one or more performance, efficiency, environmental, regulatory, or safety standards.

* * * * *